(12) United States Patent
Khanania

(10) Patent No.: US 8,474,604 B2
(45) Date of Patent: Jul. 2, 2013

(54) SYSTEMS AND METHODS FOR BELT ALIGNMENT

(76) Inventor: Souhel Khanania, Southlake, TX (US)

(*) Notice: Subject to any disclaimer, the term of this patent is extended or adjusted under 35 U.S.C. 154(b) by 123 days.

(21) Appl. No.: 13/073,684

(22) Filed: Mar. 28, 2011

(65) Prior Publication Data

US 2012/0247928 A1 Oct. 4, 2012

(51) Int. Cl.
*B65G 39/16* (2006.01)

(52) U.S. Cl.
USPC .......................................................... 198/806

(58) Field of Classification Search
USPC ........................................ 198/806, 807, 808
See application file for complete search history.

(56) References Cited

U.S. PATENT DOCUMENTS

| | | | | |
|---|---|---|---|---|
| 2,132,053 A * | 10/1938 | Sollenberger et al. | ......... | 198/808 |
| 3,368,665 A * | 2/1968 | Jinkins | ........................... | 198/806 |
| 3,593,841 A * | 7/1971 | Leow | ............................... | 198/806 |
| 4,506,782 A * | 3/1985 | Jeanneret et al. | ............. | 198/806 |
| 4,750,608 A * | 6/1988 | Harpold | ........................ | 198/807 |
| 5,609,241 A * | 3/1997 | Shaw | ............................. | 198/806 |
| 5,911,304 A | 6/1999 | Cumberlege | | |
| 6,173,830 B1 | 1/2001 | Cumberlege et al. | | |
| 6,405,854 B1 | 6/2002 | Cumberlege | | |
| 6,431,348 B2 * | 8/2002 | Malmberg | ..................... | 198/806 |
| 7,051,867 B2 * | 5/2006 | Sharp | ........................... | 198/806 |
| 7,222,726 B2 * | 5/2007 | Meade | ....................... | 198/810.03 |
| 7,669,709 B2 * | 3/2010 | Hovsto et al. | ................. | 198/806 |
| 2010/0006402 A1 * | 1/2010 | Sharp | ............................. | 198/806 |
| 2011/0272250 A1 * | 11/2011 | DeVries | ........................ | 198/617 |

OTHER PUBLICATIONS

Tru-Trac Rollers (PTY) Ltd.; "TruTrac, Belt Tracking Technology;" www.tru-trac.com/videos/TruTrac.pdf; 8 pages, 2010.
Tru-Trac® Belt Tracking Technology; "Tru-Trac Conveyor Tracking Rollers," www.tru-trac.com/index.htm; 2010; 2 pages.
Tru-Trac; "Food Grade Tracker;" www.tru-trac/pdf/food-grade-tracker-brochure.pdf; 1 pages, 2010.

* cited by examiner

*Primary Examiner* — Mark A Deuble
(74) *Attorney, Agent, or Firm* — Conley Rose, P.C.; J. Robert Brown, Jr.

(57) ABSTRACT

A belt alignment system has a first element movable in response to mechanical interference between the first element and a lateral side of a belt and a steering roller mechanically configured to change position in response to the mechanical interference. A method of aligning a belt includes changing a lateral position of a lateral side of a belt, receiving lateral movement of the belt as an input, translating the lateral movement of the belt into a change in position of a steering roller, and employing the steering roller to move the belt in a lateral direction. An oven has a belt configured for rotation in a longitudinal direction and an alignment system configured to mechanically translate movement of the belt in a transverse direction that is substantially perpendicular to the longitudinal direction into an angular movement of a steering roller relative to the transverse direction.

15 Claims, 30 Drawing Sheets

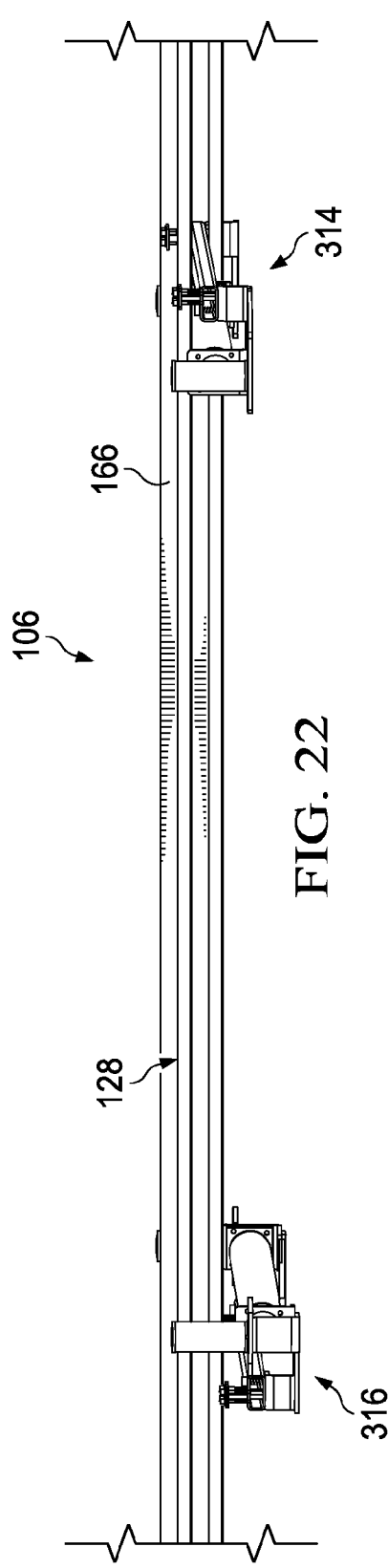
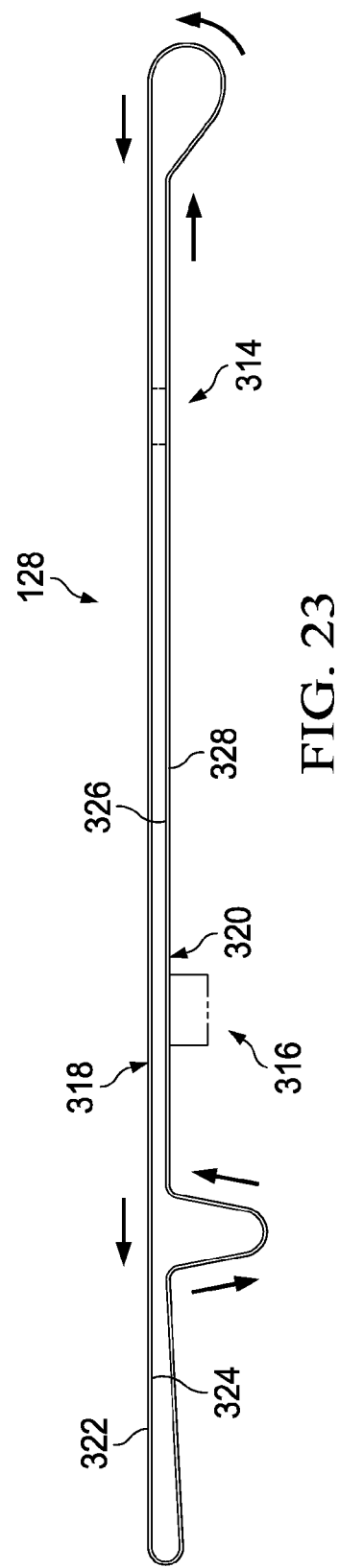

SYSTEMS AND METHODS FOR BELT ALIGNMENT

CROSS-REFERENCE TO RELATED APPLICATIONS

Not applicable

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large quantities of energy are used in the manufacture of modern food products. Systems and methods that can reduce the total energy consumption of manufacturing plants that create, package, and prepare the food would be beneficial. Therefore systems and methods that provide for the efficient manufacture of food products are desirable.

SUMMARY OF THE DISCLOSURE

In some embodiments, an oven is provided that comprises a first conveyor. In that oven, a first burner directs heat toward the first conveyor from above the first conveyor and a second burner directs heat toward the first conveyor from below the first conveyor.

In other embodiments, a method is provided for cooking foodstuff that comprises providing foodstuff on a conveyor, exposing the foodstuff to heat directed toward the foodstuff from above the conveyor, and exposing the foodstuff to heat directed toward the foodstuff from below the conveyor.

In still other embodiments, an oven is provided that comprises a first conveyor. In that oven, first conveyor insulators substantially surround the first conveyor and thereby define a first zone.

In still other embodiments, a method of cooking foodstuff is provided that comprises introducing foodstuff to a first conveyor belt within a first insulated zone. The method further comprises introducing heat into the first insulated zone and retaining a portion of the heat within the first insulated zone.

In still other embodiments, an oven is provided that comprises a substantially insulated cooking zone that closely envelopes a cooking path and a substantially insulated oven zone that substantially envelopes the cooking zone.

In still other embodiments, a belt alignment system is provided that comprises a first element movable in response to mechanical interference between the first element and a lateral side of a belt and a steering roller mechanically configured to change position in response to the mechanical interference.

In still other embodiments, a method of aligning a belt is provided that comprises changing a lateral position of a lateral side of a belt, receiving lateral movement of the belt as an input, translating the lateral movement of the belt into a change in position of a steering roller, and employing the steering roller to move the belt in a lateral direction opposite to the direction of lateral movement received as the input.

In still other embodiments, an oven is provided that comprises a belt configured for rotation in a longitudinal direction and an alignment system configured to mechanically translate movement of the belt in a transverse direction that is substantially perpendicular to the longitudinal direction into an angular movement of a steering roller relative to the transverse direction.

The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 22 is a partial oblique view of the upper conveyor system from a front-lower-right viewpoint;

FIG. 23 is an orthogonal front view of the upper belt in isolation;

DETAILED DESCRIPTION

Figure 1:
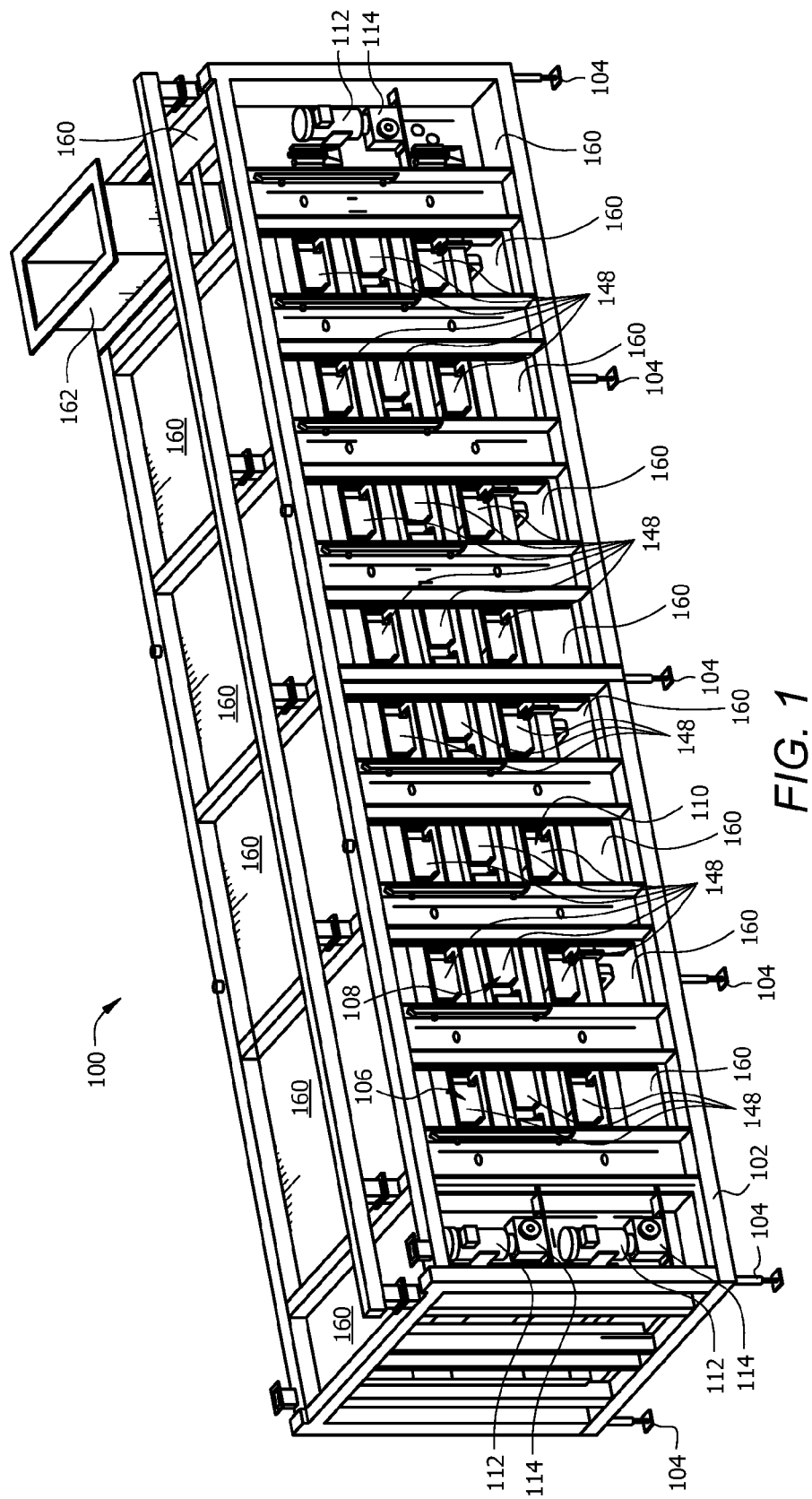
FIG. 1 is an oblique view of an oven according to the present disclosure.

In the preparation of food materials, such as, but not limited to, potato, corn and tortilla chips, cooking the foodstuff sometimes consumes large quantities of energy. Conventional industrial ovens lose a significant amount of heat and energy due to poor design and/or a lack of insulation. Systems and methods that could improve on the efficiency of ovens would greatly reduce the overall energy required to manufacture foodstuff. Accordingly, the present disclosure discloses systems and methods that may be implemented to reduce energy consumption in the process of cooking foodstuff.

Typical ovens comprise large enclosures having multiple conveyors within the enclosures. Sometimes the multiple conveyors work together to form a path along which foodstuff successively travels from one conveyor to the next. However, the typical ovens require that the entire enclosure be heated in order to cook foodstuff on the conveyors, thereby unnecessarily heating the contents of space that is not in close proximity or adjacent to the foodstuff. The unnecessary heating of the contents of a large volume of space accounts for a large amount of energy consumption and waste, rendering the cooking process unnecessarily energy inefficient.

The present disclosure provides for substantially enclosing each conveyor within substantially adjacent insulative barriers that generally serve to envelope the conveyors individually within zones. The present disclosure further discloses providing insulated ducts for connecting the various zones that relate to the conveyors so that heat is efficiently transferred between the various zones. The present disclosure provides a cooking zone that comprises the zones that are individually related to the conveyors and further comprises the insulated ducts that join the various zones. Generally, the insulative barriers serve to retain heat within the cooking zone, thereby allowing more efficient cooking of foodstuff within the cooking zone. The present disclosure further provides gas-fueled infrared burners positioned to emit and direct heat toward one or more conveyors from both above the conveyors and from below the conveyors. Still further, the present disclosure provides enclosing the cooking zone within an oven zone that substantially envelops the entirety of the cooking zone so that heat loss from the cooking zone is reduced. While every combination is not discussed, the present disclosure expressly contemplates combining the disclosed features in many combinations. For example, an oven according to the disclosure may comprise one or more conveyors that are enclosed by insulative barriers and one or more of those conveyors may have infrared burners associated with the conveyor to emit and direct heat on the conveyor from both above and below the conveyors.

Further, in some ovens, belts may become misguided and/or out of alignment. Such alignment issues may arise due to non-uniform longitudinal stretching of the belt, poor alignment of drive and/or guide rollers, gears, and/or other belt path devices, and/or non-uniform longitudinal and/or transverse thermal expansion of the belt. A misaligned belt may present increased maintenance costs, increased food safety concerns, and/or an increase in oven downtime. While belt alignment systems for typical use conveyor belts may be widely available, those belt alignment systems are not suitable for use in high temperature food ovens. Some of the belt alignment systems for typical use conveyor belts are not suitable for use in high temperature food ovens because the materials used to construct the alignment systems are not considered safe for use in a food preparation environment. In other cases, belt alignment systems for typical use conveyor belts are not suitable for use in high temperature ovens because the components of the belt alignment systems cannot withstand the high temperatures of the ovens.

The present disclosure provides belt alignment systems and methods that are safe for use in food preparation environments and that are well suited for use in the interior of a high temperature oven. The present disclosure provides belt alignment systems and methods that receive lateral movement of a belt as an input and outputs an adjustment to a steering roller as an output. The present disclosure further provides systems and methods of aligning a belt of a high temperature oven wherein the operation of the system and method, once the system is installed, is automatic and requires no human, electronic, or computer oversight during normal use of the systems and methods.

Referring now to FIGS. 1-4, an oven 100 is disclosed. Oven 100 comprises a supportive frame 102 having a plurality of structural components, only some of which are described in greater detail below. The frame 102 is supported by feet 104 attached to the bottom of the frame 102. The oven has a left side shown generally leftward in FIG. 2 and a right side shown generally rightward in FIG. 2. Further, the oven 100 has a front side that is displayed generally between the left and right sides in FIG. 2. Accordingly, the oven 100 comprises a top side opposite the bottom side and a rear side opposite the front side. It will be appreciated that the above directional conventions apply throughout the description of oven 100.

Most generally, the oven 100 comprises an upper conveyor system 106, a middle conveyer system 108, and a lower conveyor system 110. Each of the conveyor systems 106, 108, 110 comprise the necessary equipment for operation of each conveyor system 106, 108, 110 independent of the others. In the preferred embodiment, each conveyor system 106, 108, 110 comprises its own motor 112, gearbox 114, drive shaft 116, and belt tensioners 118. It will be appreciated that in other embodiments, a single motor may be used to power one or more conveyors. Each conveyor system 106, 108, 110 further comprises the necessary drive drums 120, tensioner drums 122, and free drums 124 to carry conveyor belts. The conveyor systems 106, 108, 110, together, generally define a cooking path along which foodstuff is carried and cooked while present on the cooking path.

At an entrance 126 formed by the frame 102 (most clearly shown in FIG. 3), foodstuff may be introduced to an upper surface of an upper belt 128. The upper conveyor system 106 operates to rotate upper belt 128 in a generally counterclockwise direction as viewed in FIG. 2 so that the upper surface of upper belt 128 moves from right to left. Middle conveyor system 108 is located generally below upper conveyor system 106 so that as foodstuff reaches the left end of the upper belt 128, the foodstuff falls from the upper belt 128 to an upper surface of a middle belt 130 of middle conveyor system 108.

Figure 2:
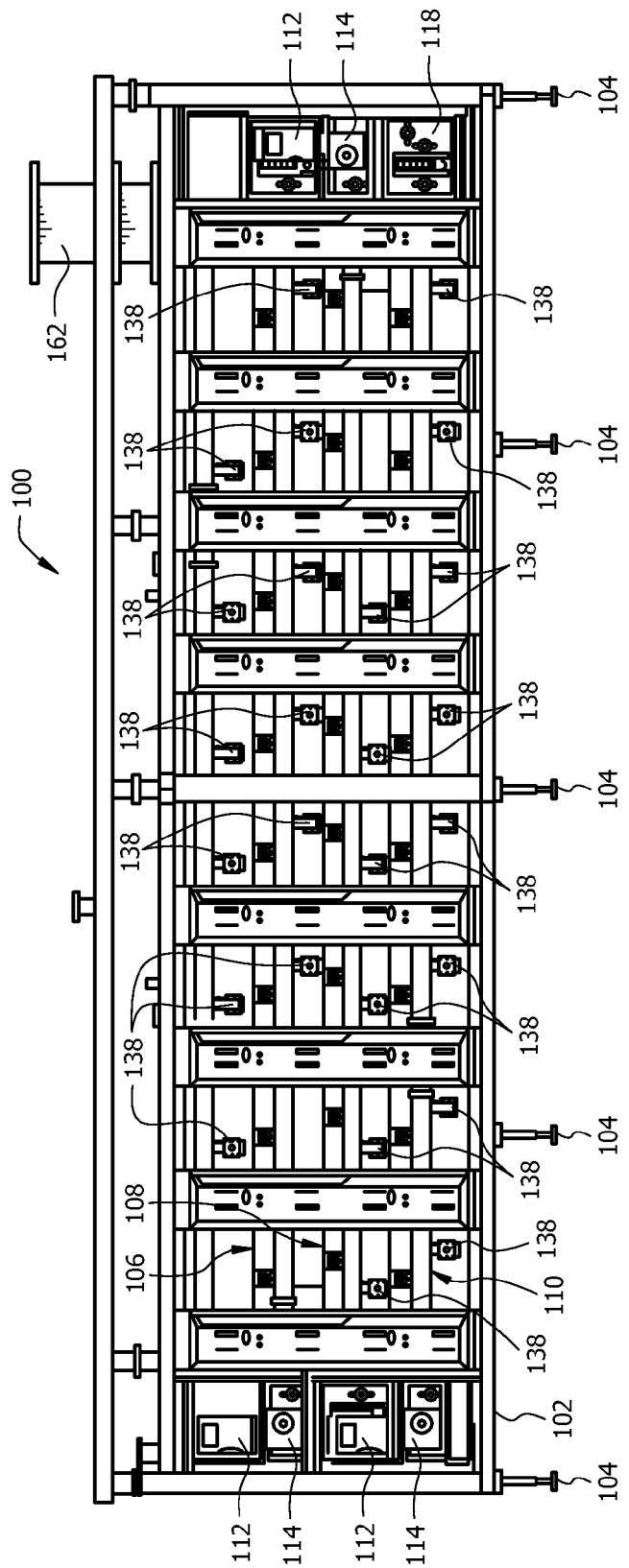
FIG. 2 is a front view of the oven of FIG. 1.
Figure 3:
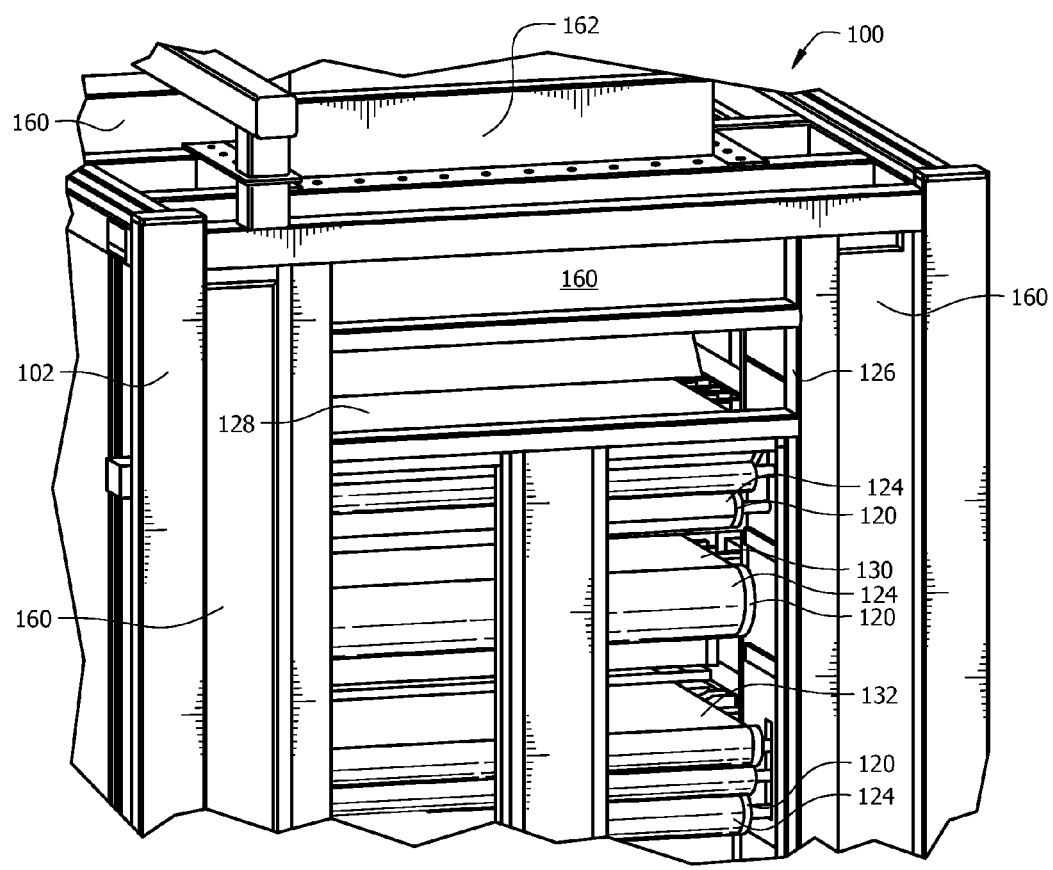
FIG. 3 is an enlarged oblique view of a portion of the upper right side of the oven of FIG. 1.
Figure 4:
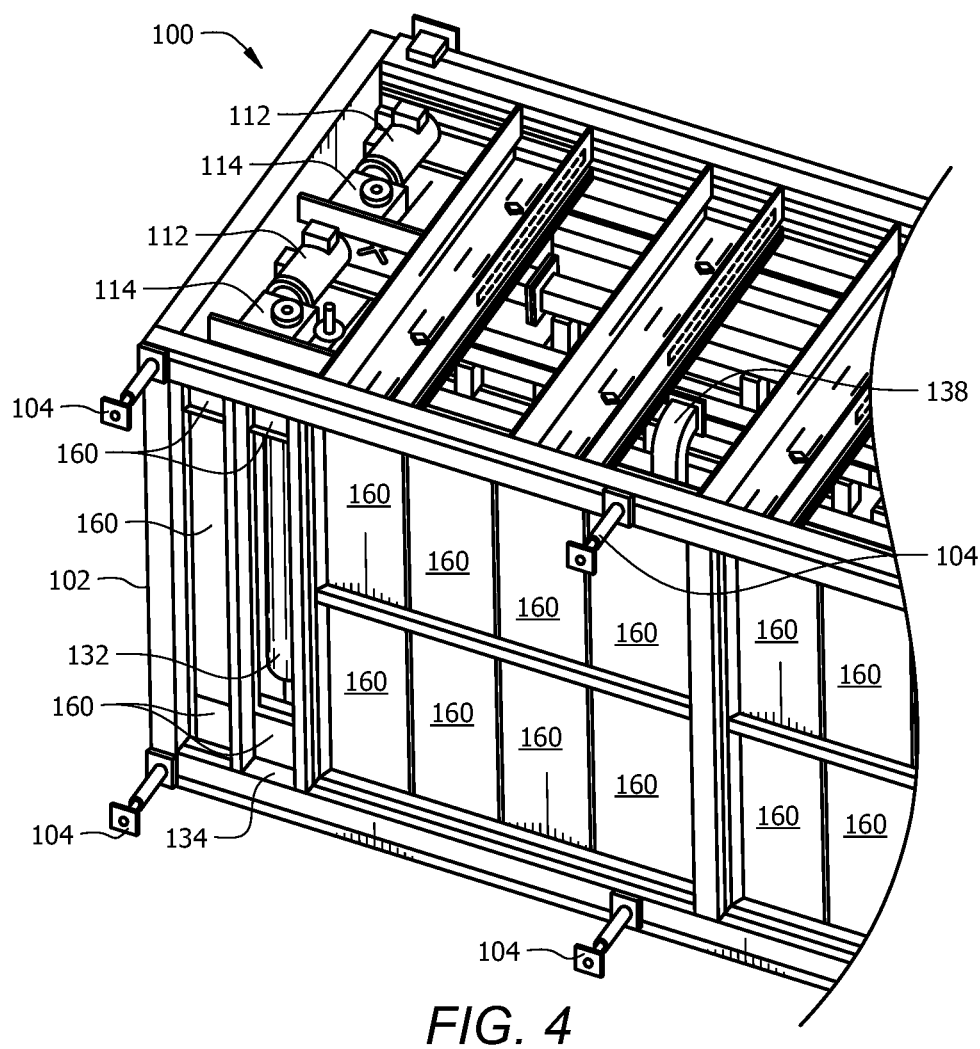
FIG. 4 is an enlarged oblique view of a portion of the lower left side of the oven of FIG. 1.

The middle conveyor system 108 operates to rotate middle belt 130 in a generally clockwise direction as viewed in FIG. 2 so that the upper surface of middle belt 130 moves from left to right.

Lower conveyor system 110 is located generally below middle conveyor system 108 so that as foodstuff reaches the right end of the middle belt 130, the foodstuff falls from the middle belt 130 to an upper surface of a lower belt 132 of lower conveyor system 110. The lower conveyor system 110 operates to rotate lower belt 132 in a counterclockwise direction as viewed in FIG. 2 so that the upper surface of lower belt 132 moves from right to left. As foodstuff reaches the left end of the lower belt 132 the foodstuff is free to fall from lower belt 132 down through an exit 134 formed generally by the frame 102 (most clearly shown in FIG. 4). In some embodiments the oven 100 may be associated with other foodstuff preparation and/or packaging equipment so that once foodstuff passes through exit 134 the foodstuff is collected and further processed and/or packaged. It will be appreciated that, in this embodiment, the cooking path of foodstuff is defined as the path along which foodstuff travels within the oven 100 (i.e. along the conveyor belts 128, 130, 132 as described above).

The cooking path is more than a path along which foodstuff is moved. The cooking path is a path along which foodstuff is cooked by exposure to high temperatures through various forms of heat transfer as discussed below. In this embodiment, each conveyor system 106, 108, 110 has a plurality of gas fueled infrared burners 136 (see FIGS. 5 and 12) (hereinafter referred to as "IR burners") associated therewith. The IR burners 136 are fed a mixture of air and fuel gas through mixers 138 that are described in greater detail below (see FIG. 11). While IR burners 136 are not shown in FIGS. 1-4, it will be appreciated that one IR burner 136 is associated with each mixer 138. As described in more detail below, each IR burner 136 is capable of directing radiant heat in a directional manner.

Figure 5:
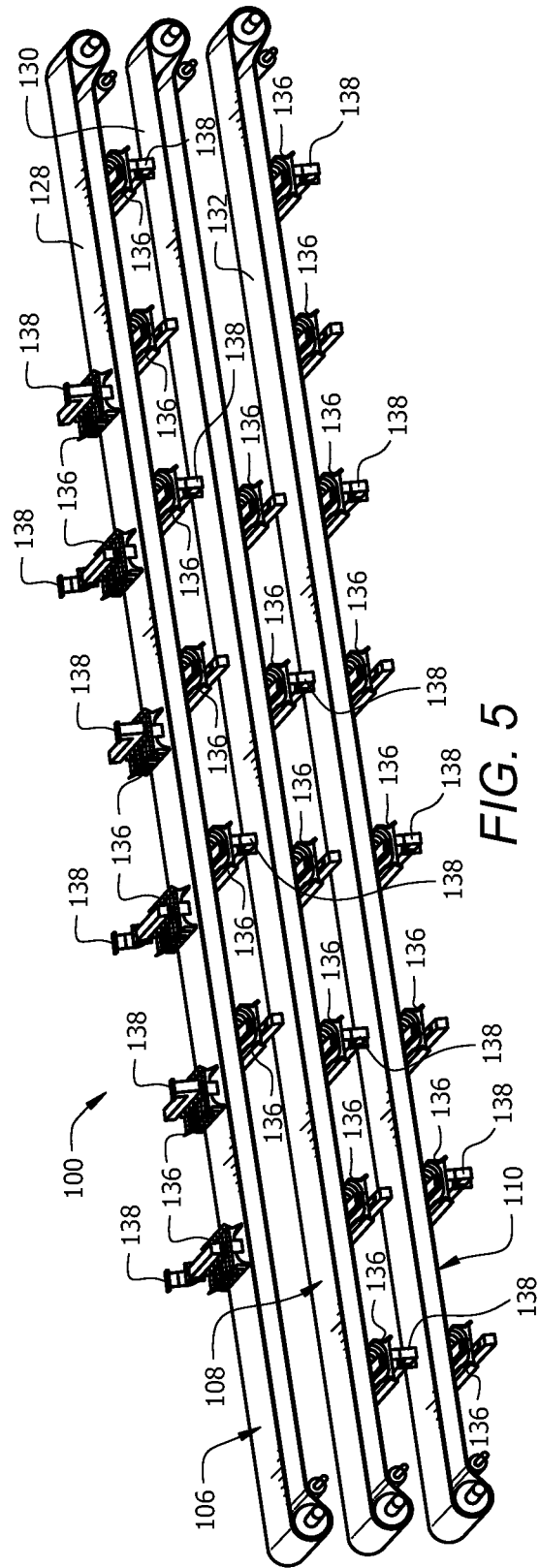
FIG. 5 is an oblique view of the belts and IR burners of the oven of FIG. 1.
Figure 6:
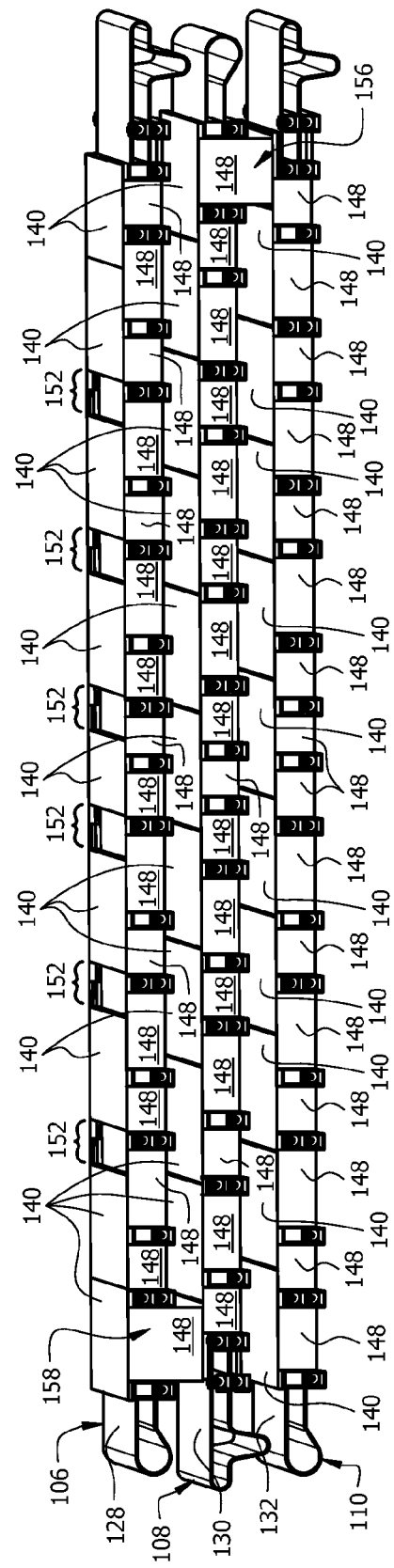
FIG. 6 is an upper oblique view of the belts and cooking zone of the oven of FIG. 1.
Figure 7:
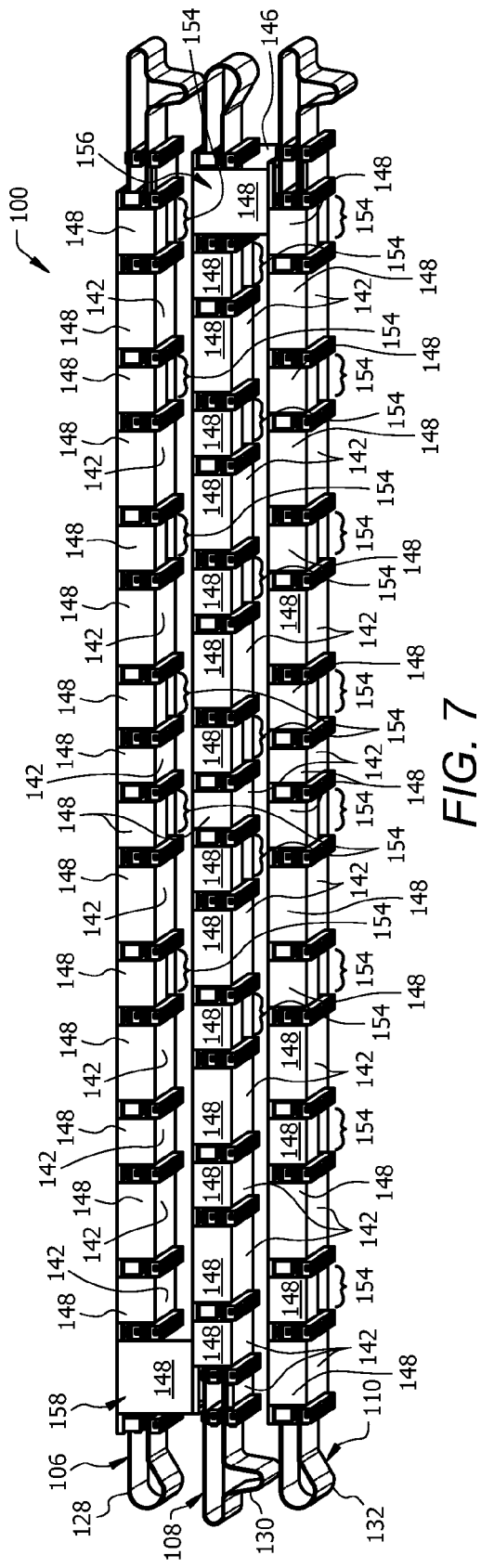
FIG. 7 is a lower oblique view of the belts and cooking zone of the oven of FIG. 1.
Figure 8:
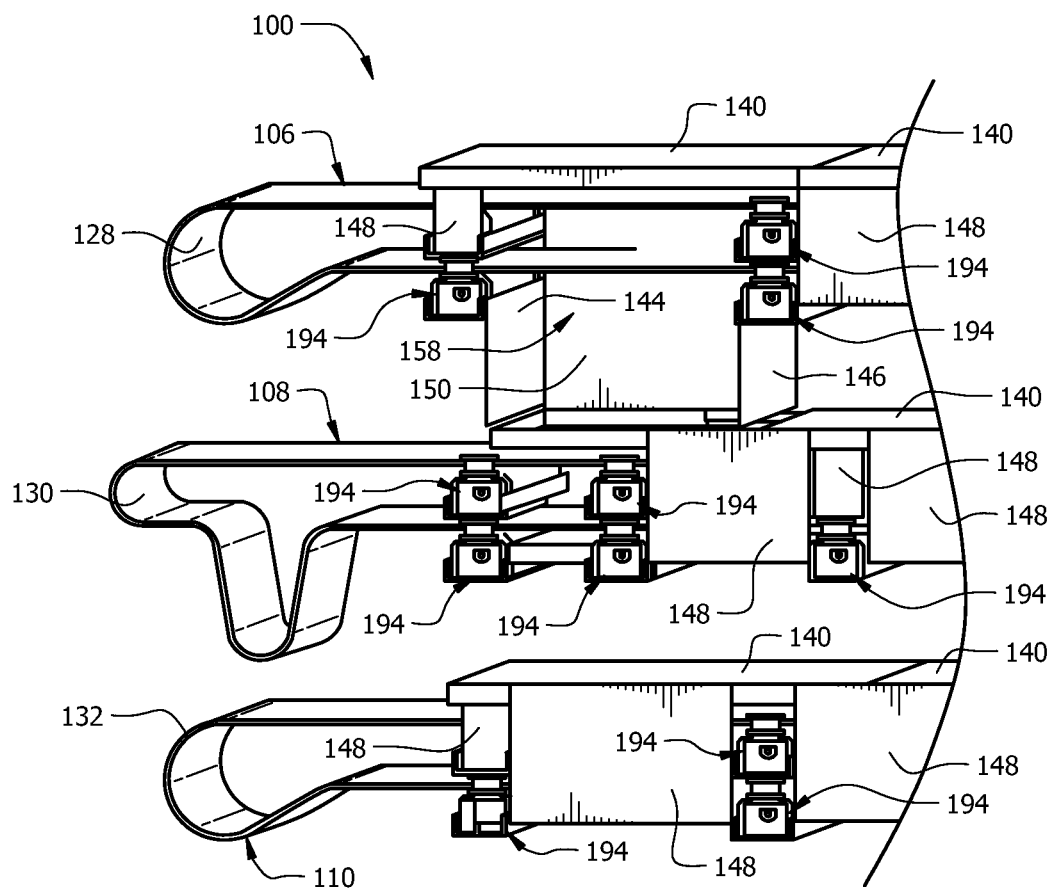
FIG. 8 is an enlarged oblique view of the left side of the belts and cooking zone of the oven of FIG. 1.
Figure 9:
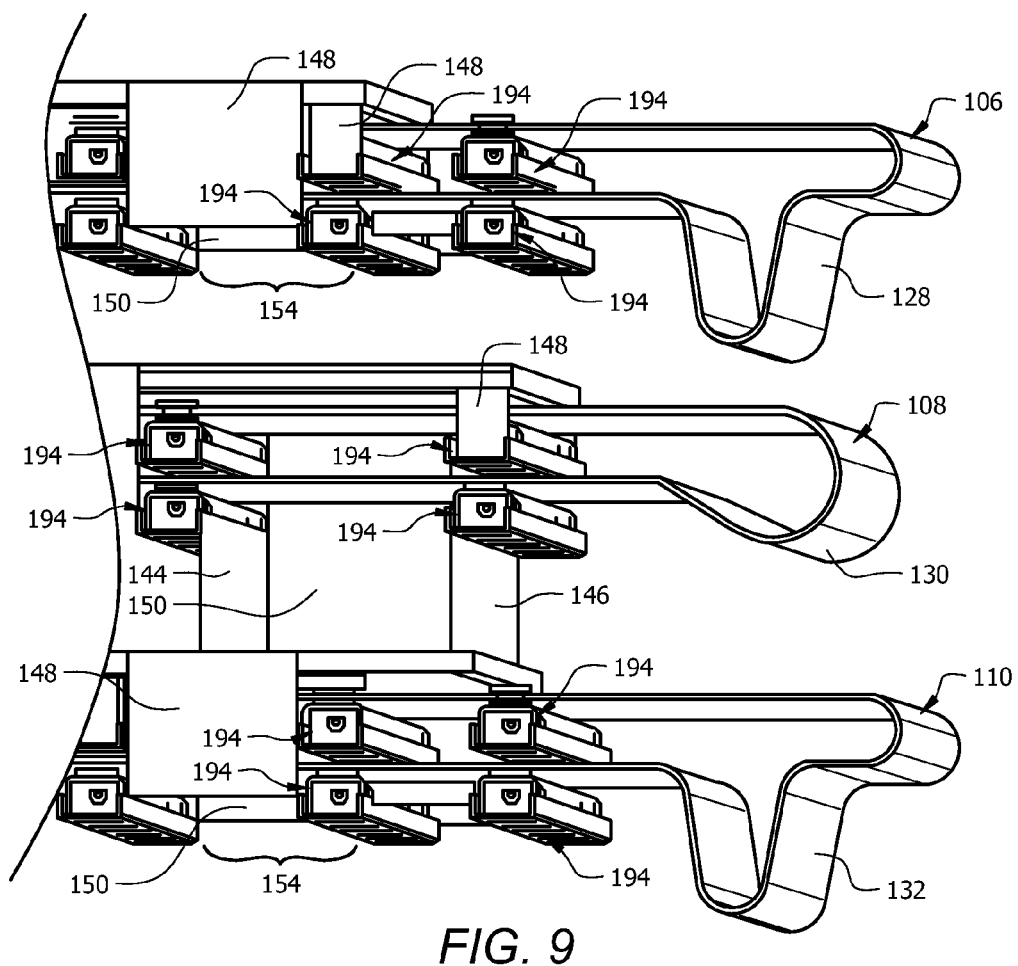
FIG. 9 is an enlarged oblique view of the right side of the belts and cooking zone of the oven of FIG. 1.

Referring now to FIG. 5, the upper, middle, and lower belts 128, 130, and 132 are shown along with the IR burners 136, but without the remainder of the components of the oven 100. In this embodiment, the upper belt 128 is associated with six IR burners 136 that are located slightly above the upper belt 128 and that are oriented to emit radiant heat downward onto upper belt 128. The upper belt 128 is further associated with six IR burners 136 that are located slightly below the upper belt 128 and that are oriented to emit radiant heat upward onto upper belt 128. Similarly, middle belt 130 is associated with six IR burners 136 that are located slightly below the middle belt 130 and that are oriented to emit radiant heat upward onto middle belt 130. Finally, lower belt 132 is associated with eight IR burners 136 that are located slightly below the lower belt 132 and that are oriented to emit radiant heat upward onto the lower belt 132. Of course, in alternative embodiments, an upper belt may comprise IR burners only above or below the upper belt, a middle belt may comprise IR burners both above and below the middle belt or may comprise IR burners only above the middle belt, and a lower belt may comprise IR burners both above and below the middle belt or may comprise IR burners only above the lower belt. Also, burners other than IR burners may be used or used in combination with IR burners.

A feature of the oven 100 is that heat generated by IR burners 136 is not merely cast upon the belts 128, 130, 132 and easily allowed to pass into the general interior space of the oven 100 (where the interior space is generally defined by the left, right, bottom, top, front, and rear of the oven 100), but rather, the heat is retained near the foodstuff. Specifically, the oven 100 is constructed in a manner that substantially encloses the cooking path in a minimal envelope of space, thereby retaining the heat generated by the IR burners 136 in space near the foodstuff that is carried along the cooking path. Most generally, the heat is retained by constructing insulative barriers to prevent the escape of heat so that the cooking path (i.e. each conveyor belt 128, 130, 132) is substantially enclosed within an insulated cooking zone.

Referring now to FIGS. 6-9, the insulated cooking zone is defined generally as a substantially contiguous space that is substantially bounded by insulation in close proximity to the cooking path. In this embodiment, an upper zone substantially surrounds the upper belt 128 and is defined generally by the space bounded by upper insulators 140, lower insulators 142, left insulators 144, right insulators 146, front insulators 148, and rear insulators 150. The various insulators 140, 142, 144, 146, 148, 150 are generally plate-like in shape and serve to closely bound the belts 128, 130, 132 while being sized and/or otherwise shaped to accommodate protrusions of other portions of the oven 100 as necessary. In keeping with the goal of substantially enclosing the cooking path within a cooking zone, the insulators 140, 142, 144, 146, 148, 150 generally form substantially continuous walls around the belts 128, 130, 132. However, upper burner openings 152 and lower burner openings 154 are present to allow a passage for radiant heat to enter the cooking zone from IR burners 136. The insulators 140, 142, 144, 146, 148, 150 also form a middle zone that substantially surrounds the middle belt 130 and a lower zone that substantially surrounds the lower belt 132.

It will further be appreciated that the upper, middle, and lower zones are connected to generally form the single cooking zone. Specifically, the insulators 140, 142, 144, 146, 148, 150 form a right duct 156 that generally connects the right side of the lower zone to the right side of the middle zone. The insulators 140, 142, 144, 146, 148, 150 also generally form a left duct 158 that generally connects the left side of the middle zone to the left side of the upper zone. The joint nature of the lower, middle, and upper zones allow heat and hot air to travel in a directed manner from left to right in the lower zone, up through the right duct 156, from right to left in the middle zone, up through the left duct 158, and finally from left to right in the upper zone. The heat and hot air in the cooking zone generally travels along a path opposite in direction to the direction the foodstuff is carried along the cooking path.

By directing the heat and hot air in the manner described above, the heat generated by IR burners 136 associated with the lower belt 132 that is not absorbed by foodstuff on the lower belt 132 is not lost. Instead, the unabsorbed heat encounters foodstuff along the entire length of the cooking path until the heat is ultimately fully absorbed by foodstuff along the cooking path or the heat exits the cooking zone near the right side of the upper zone. It will be appreciated that front insulators 148 that aid in forming the right duct 156 and left duct 158 are omitted from view in FIGS. 8 and 9 to allow a view inside the right duct 156 and the left duct 158.

Referring again to FIGS. 1-4, the oven 100 further comprises an insulated oven zone that is generally defined by outer insulators 160 that bound the oven zone. The oven zone substantially envelopes the cooking zone so that any heat escaping the cooking zone within the oven 100 is retained within the oven zone. It will be appreciated that while outer insulators 160 are mostly shown as being associated with the top and bottom sides of the oven 100, outer insulators 160 associated with the right, left, front, and rear sides of the oven 100 are expressly contemplated by this disclosure. Some outer insulators 160 associated with the right, left, front, and rear sides of the oven 100 are not shown in order to provide clarity in view the other components of the oven 100.

The effect of providing an insulated oven zone is that temperature gradients at the interface of the cooking zone and the oven zone are less than what the temperature gradients would be between the cooking zone and an otherwise existing adjacent ambient zone. Since the temperature gradient between the cooking zone and the next adjacent zone is lessened, a lower amount of heat transfer will occur between the cooking zone and the next adjacent zone. In other words, with the provision of the oven zone, heat will tend to transfer away from the cooking zone at a reduced rate. Further, an exhaust heat duct 160 is provided that is shown as a substantially rectangular structure and that connects the oven zone to another space. In some embodiments, the exhaust heat duct 162 may direct exhaust heat to the exterior of a building that houses the oven 100. In other embodiments, the exhaust heat duct 162 may direct heat to another device or zone to allow recapture and/or reuse of the exhausted heat.

Figure 10:
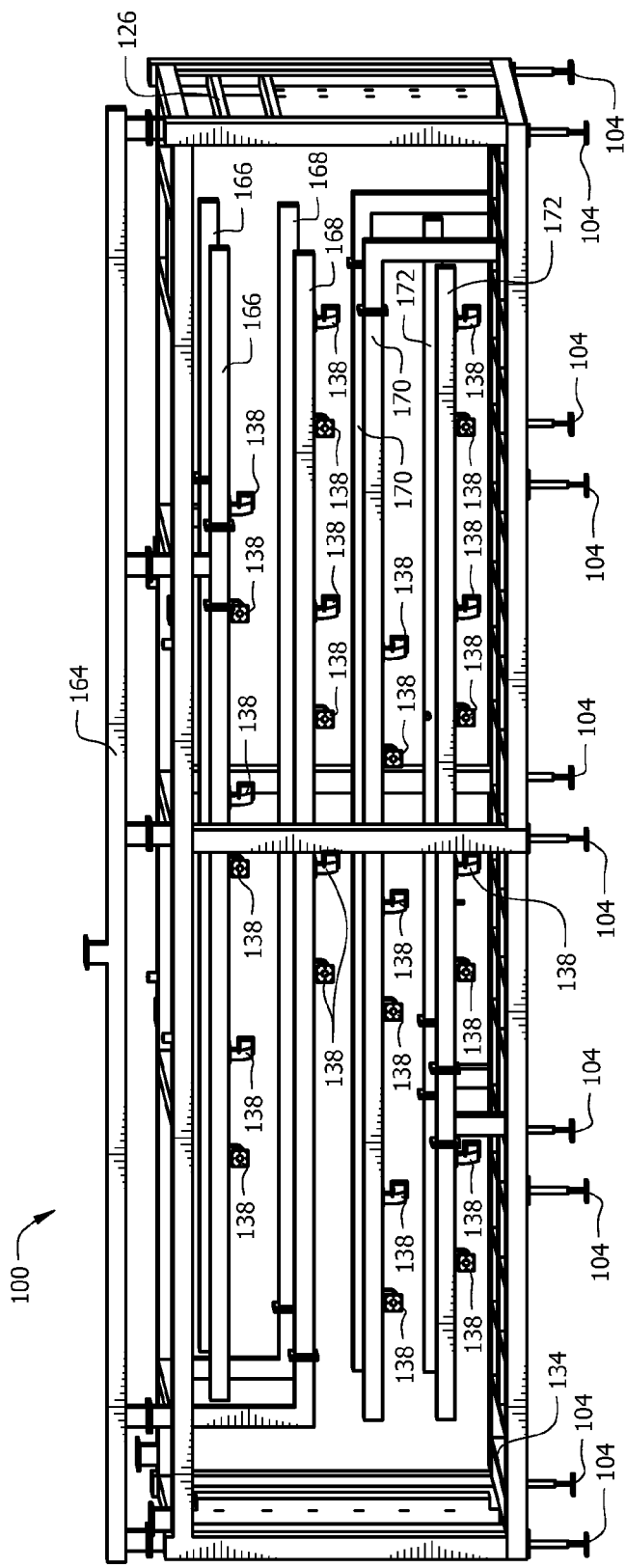
FIG. 10 is a front oblique view the frame and air delivery system of the oven of FIG. 1.

Referring now to FIG. 10, a simplified view of the frame 102 is shown to illustrate that the frame 102 serves not only as a structural support system, but also as an air delivery system. Specifically, frame 102 comprises an air input manifold 164 that supplies air to top burner upper manifolds 166 that supply air to IR burners 136 that direct heat downward onto upper belt 128. Similarly, frame 102 comprises supply air to bottom burner upper manifolds 168 that supply air to IR burners 136 that direct heat upward onto upper belt 128. Further, frame 102 comprises middle manifolds 170 that supply air to the IR burners 136 that direct heat upward onto middle belt 130. Finally, frame 102 comprises lower manifolds 172 that supply air to the IR burners 136 that direct heat upward onto lower belt 132. Each manifold 166, 168, 170, 172 has a plurality of mixers 138 attached thereto and the mixers 138 serve as outlets for air supplied through the manifolds 166, 168, 170, 172.

Figure 11:
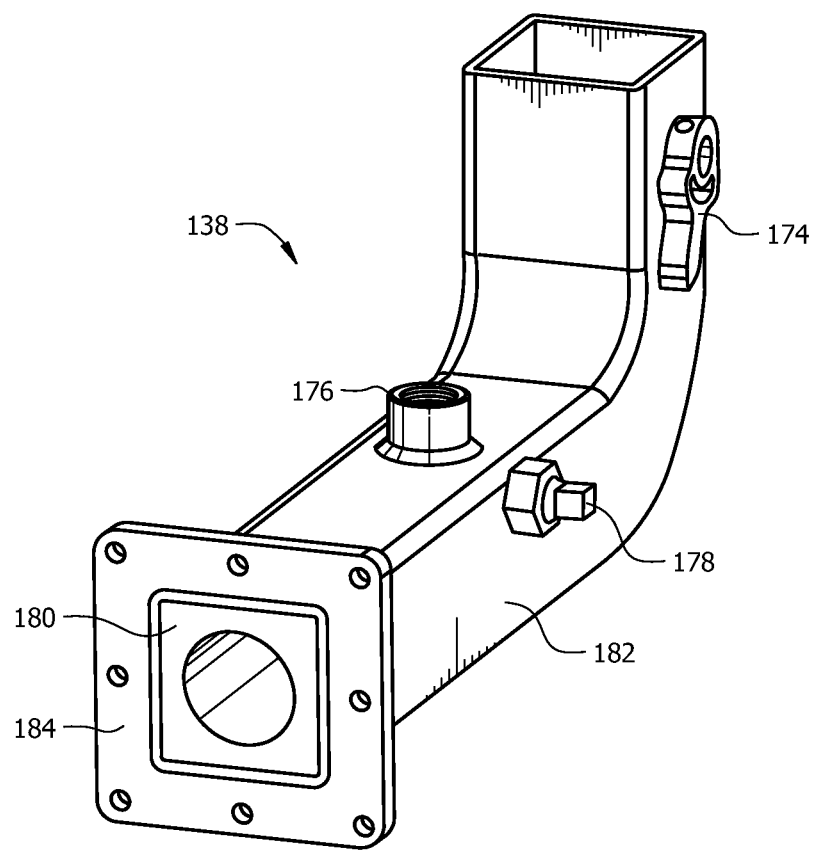
FIG. 11 is an oblique view of a mixer of the oven of FIG. 1.

Referring now to FIG. 11, a mixer 138 is shown. The mixer 138 comprises a latch 174 for securing mixer 138 to one of the previously described manifolds 166, 168, 170, 172. The mixer 138 further comprises a gas inlet 176 for attachment to a gas supply line. The mixer 138 also comprises a gas adjustment 178 that functions to alter the flow rate of fuel gas into the mixer 138 through the gas inlet 176, thereby providing a convenient way to adjust a gas-air mixture that exits a mixer insert 180. Mixer insert 180 is shaped to provide improved mixing of the air and gas as compared to the mixing of the air and gas that would otherwise occur in the tubing-shaped body 182 of the mixer 138. The mixer 138 further comprises a mounting plate 184 for attachment to a burner manifold.

Figure 12:
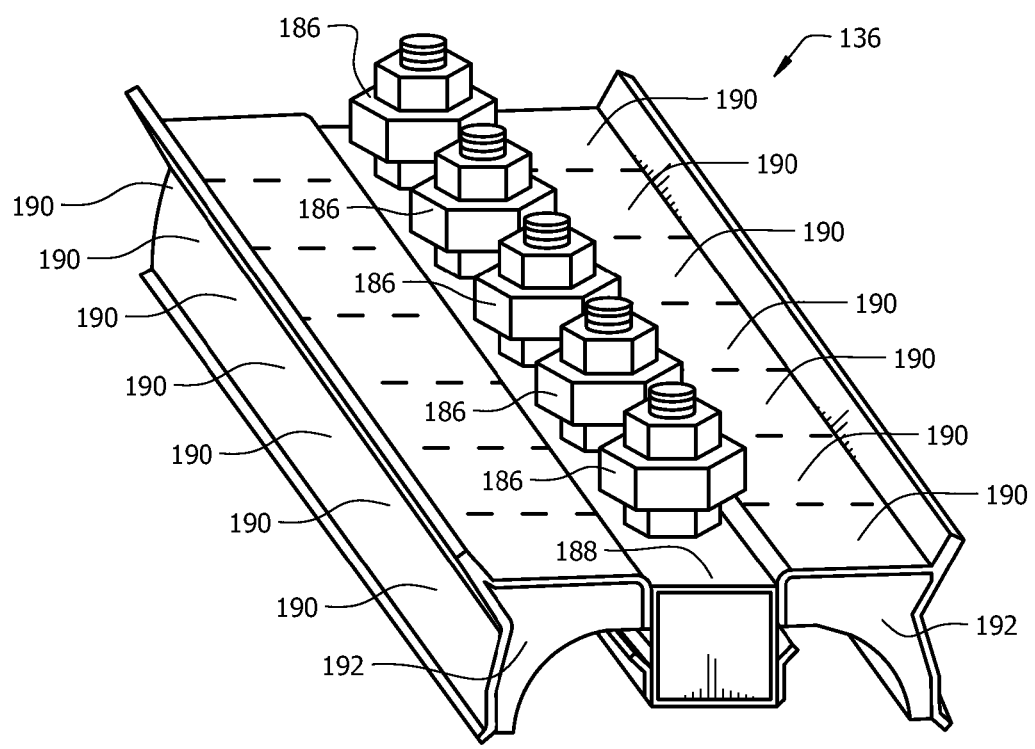
FIG. 12 is an oblique view of an IR burner of the oven of FIG. 1.

Referring now to FIG. 12, an IR burner 136 is shown in greater detail. The IR burner 136 comprises a plurality of mixture inputs 186 that distribute the gas-air mixture along the length of a burner tube 188. The IR burner 136 further comprises forms 190 that serve to hold ceramic reflector-emitters 192. The reflector-emitters 192 serve the dual role of reflecting radiant heat in a concentrated manner in a direction generally away from the forms 190 while also becoming heated to emit infrared radiation. The emitted infrared radiation serves to heat foodstuff and the components that carry foodstuff along the cooking path.

Figure 13:
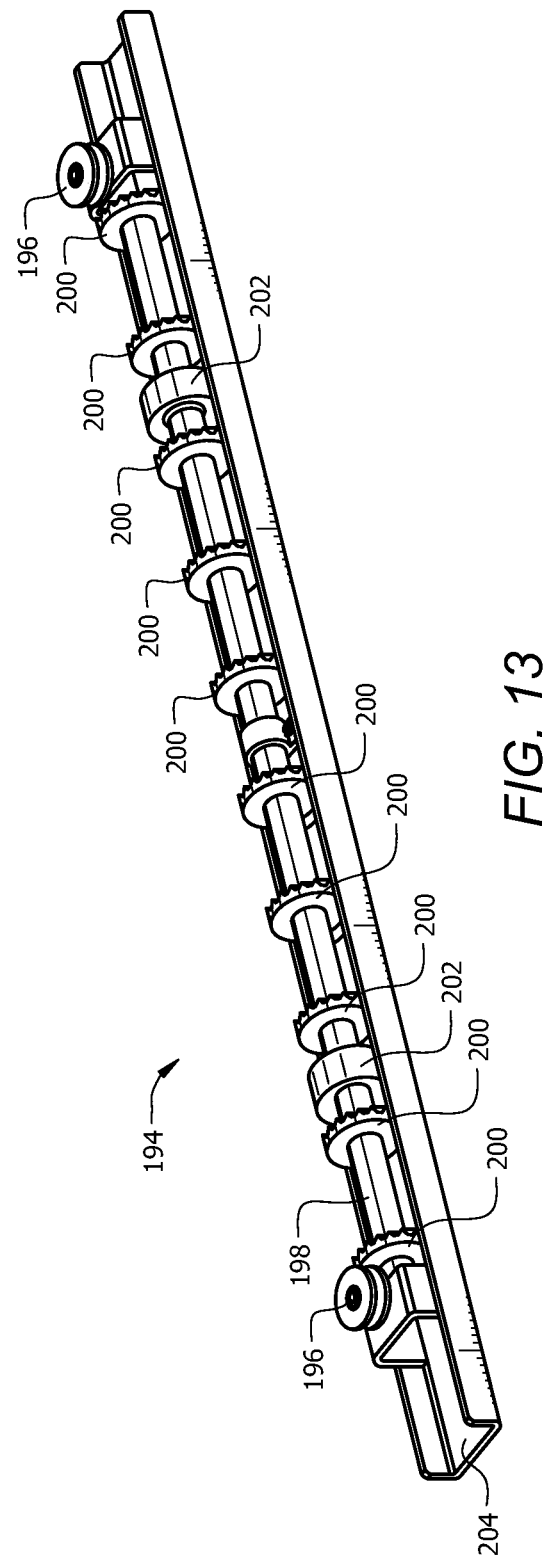
FIG. 13 is an oblique upper view of a belt guide of the oven of FIG. 1.

Referring now to FIG. 13, a belt guide 194 is shown. A plurality of belt guides 194 are used in oven 100 to maintain a front-to-back alignment of the belts 128, 130, 132. To keep the belts 128, 130, 132 aligned from front to back, the belts 128, 130, 132 are guided between side pulleys 196 that oppose the front and rear sides of the belts 128, 130, 132. To keep the belts 128, 130, 132 generally flat where appropriate, a support shaft 198 is provided with support gears 200 and support bearings 202. The support shaft turns freely due to the support bearings 202 while the support gears 200 actually engage and vertically support the belts 128, 130, 132. The support gears 200 have a larger diameter than the support bearings 202. The components of the belt guide 194 are all commonly carried by a support bar 204 that is in turn supported by other structures of the oven 100.

Figure 14:
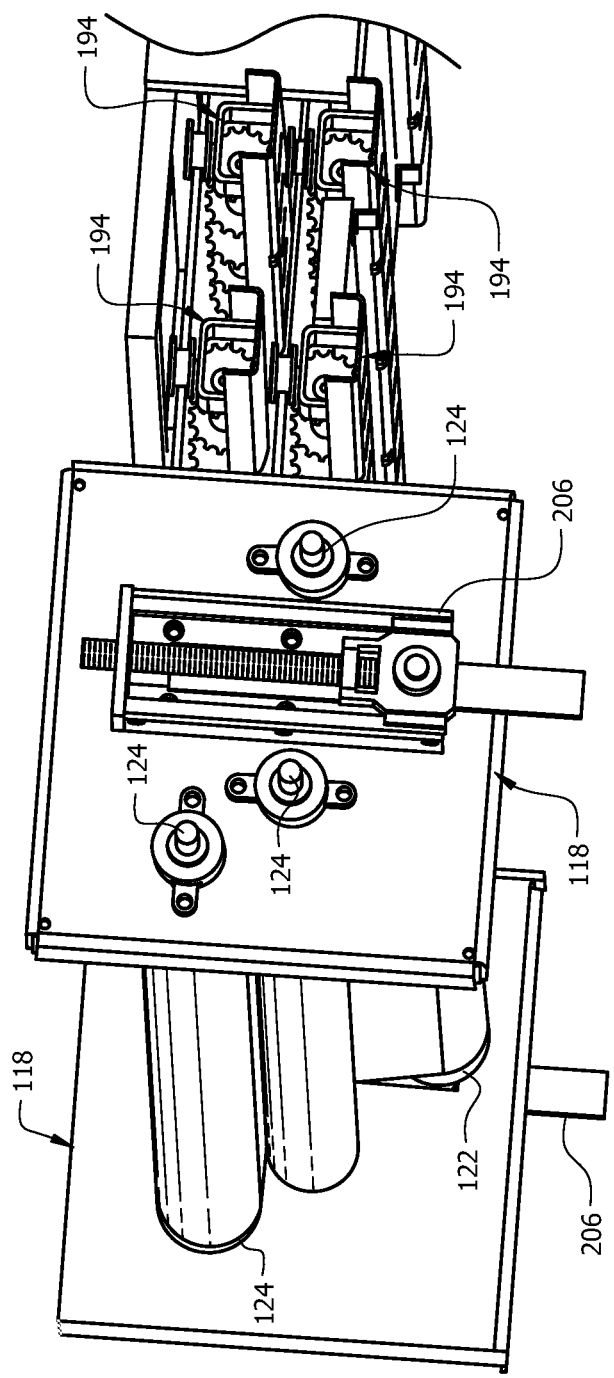
FIG. 14 is an oblique front view of two belt tensioners of the oven of FIG. 1.

Referring now to FIG. 14, belt tensioners 118 are shown that serve to provide a convenient adjustment to the tension of belts 128, 130, 132. The belt tensioner 118 comprises an adjustable shaft mount 206 that allows upward or downward movement of tensioner drum 122. As tensioner drum 122 is moved up, the tension of the belt is decreased. As the tensioner drum 122 is moved down, the tension of the belt is increased.

Figure 15:
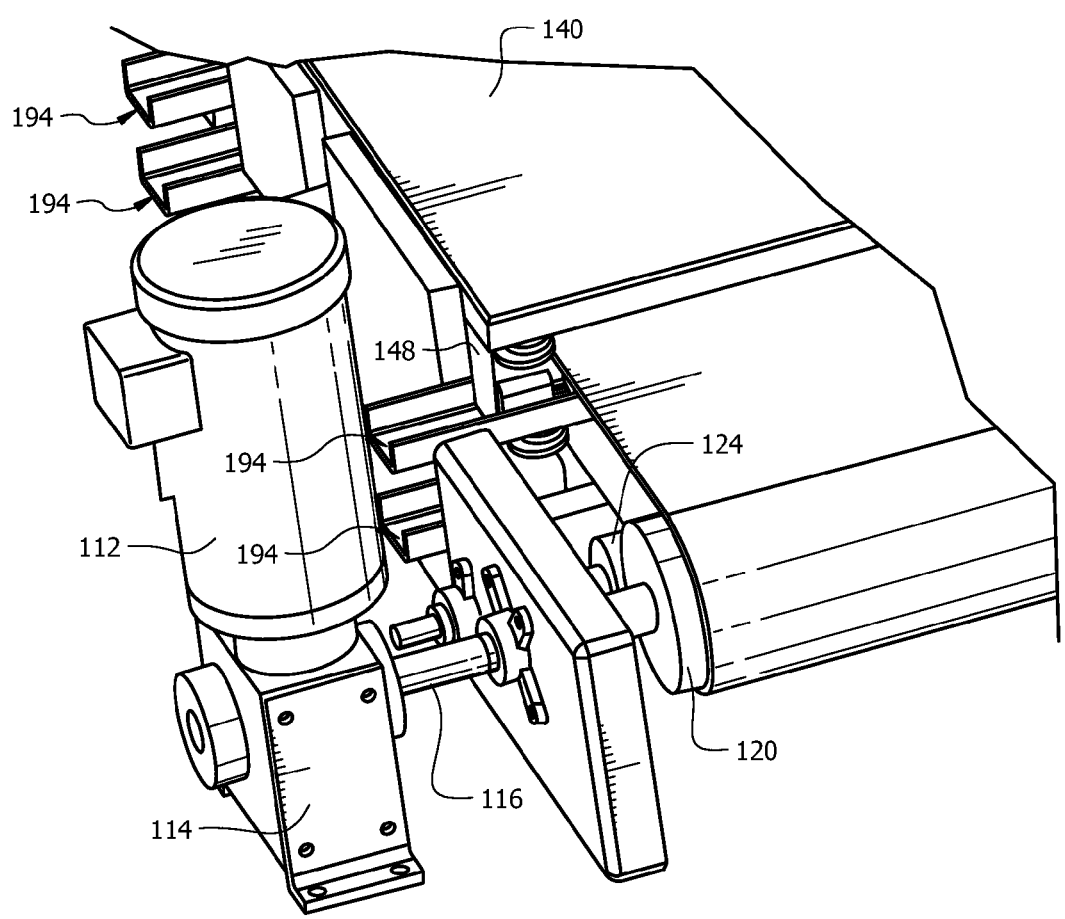
FIG. 15 is an oblique view of a motor, gearbox, and drive shaft of the oven of FIG. 1.

Referring now to FIG. 15, an enlarged view of a motor 112, gearbox 114, and drive shaft 116 are shown in association with a drive drum 120 and a belt. Motor 112 is an electric motor, however, in alternative embodiments, the motor may be a pneumatic motor, hydraulic motor, or any other suitable motor. The motor 112 is connected to a gearbox 114 which is in turn connected to a drive shaft 116 that drives the drive drum 120. When the drive drum 120 is rotated, the belt is moved.

Figure 16:
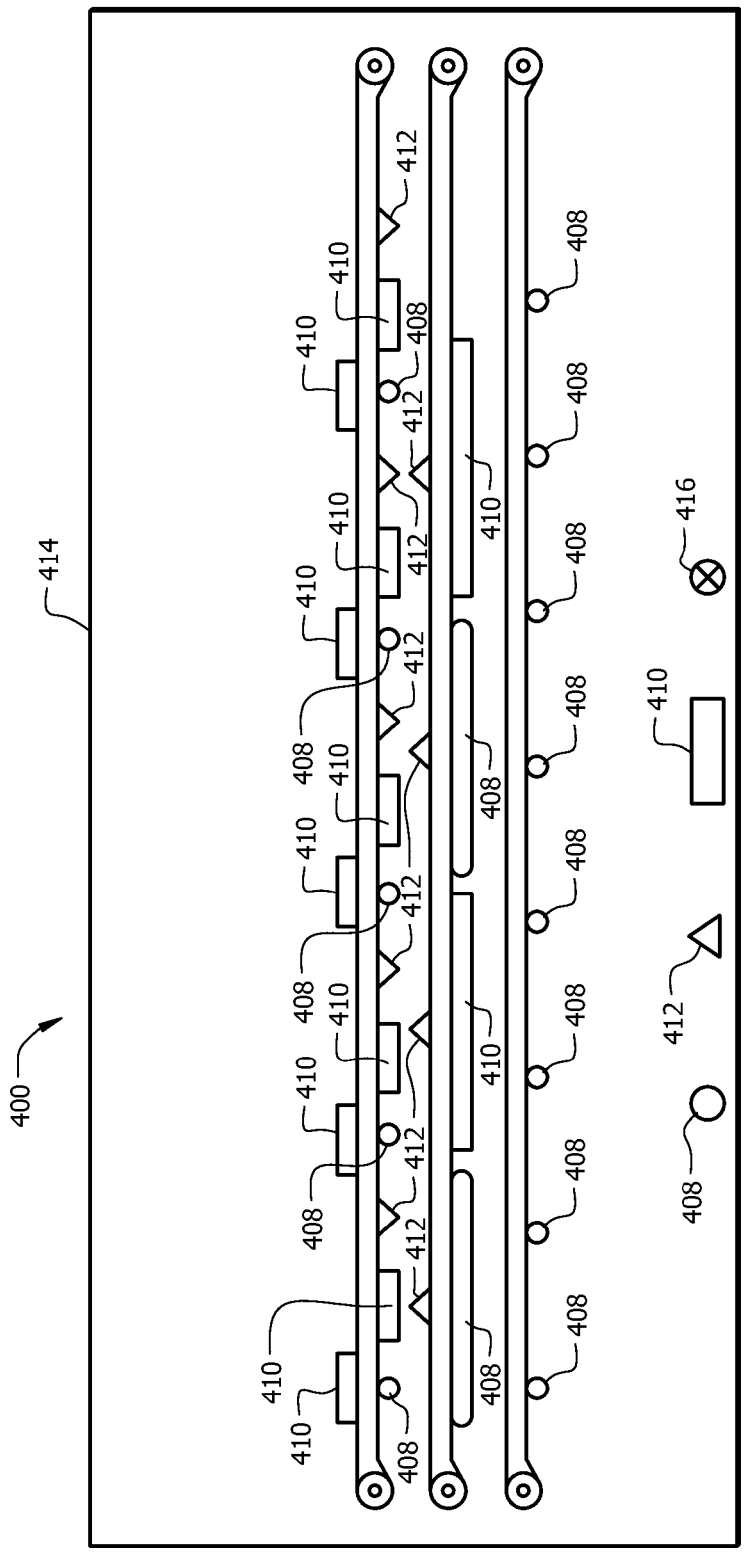
FIG. 16 is a simplified front view of another oven according to the present disclosure.

Referring now to FIG. 16, an alternative embodiment of an oven 400 is shown in simplified form. Oven 400 is substantially similar to oven 100 but for the choice of heat generators. Specifically, oven 400 comprises an upper belt 402, a middle belt 404, and a lower belt 406 that are connected and insulated to have a cooking zone substantially similar to the cooking zone of oven 100. Oven 400 comprises a combination of slit-tube gas burners 408, IR burners 410, and microwave emitters 412. Further, it will be appreciated that the slit-tube gas burners 408 and IR burners 410 associated with the middle belt 404 are oriented lengthwise with the middle belt 404. However, the slit-tube gas burners 408 and IR burners 410 associated with the upper belt 402 are oriented generally across the upper belt 402 from front to back. Further, an oven zone 414 comprises a slit-tube gas burner 408, an IR burner 410, and a microwave emitter 412 within the oven zone 414 but outside the cooking zone. The oven zone 414 further comprises a forced air fan 416 for circulating air in the oven zone 414. Of course, in alternative embodiments, the types of heat generators, the placement of the heat generators 408, 410, 412 and fans 416 may be different than shown and the various combinations of components and component placements may be used in combination with other embodiments disclosed herein.

Figure 17:
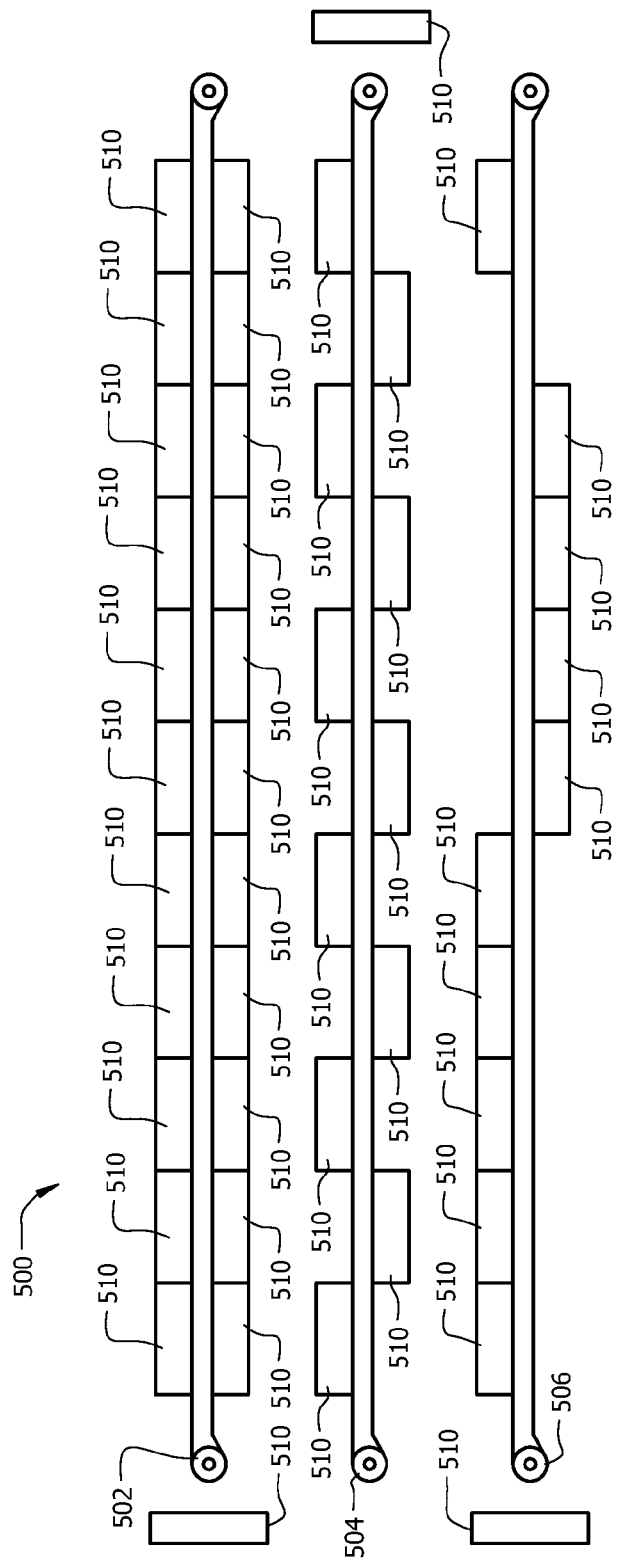
FIG. 17 is a simplified front view of still another oven according to the present disclosure.

Referring now to FIG. 17, an alternative embodiment of an oven 500 is shown in simplified form. Oven 500 is substantially similar to oven 100 but for the placement of heat generators. Specifically, oven 500 comprises an upper belt 502, a middle belt 504, and a lower belt 506 that are connected and insulated to have a cooking zone substantially similar to the cooking zone of oven 100. Oven 500 comprises IR burners 510. IR burners 510 are placed continuously along both the top and bottom side of upper belt 502. IR burners 510 are alternatingly placed along the middle belt 504 so that there is no overlap in IR burners 510 but also so that foodstuff is always directly above or directly below an IR burner 510 while on middle belt 504. IR burners 510 are also placed substantially adjacent one another to form a series of adjacent IR burners 510 on the upper left side of the lower belt 506. However, another series of adjacent IR burners 510 is located just to the right of the upper left series of IR burners 510 on the bottom side of the lower belt 506. Another IR burner 510 is located near the right end of the lower belt 506 on the upper side of the lower belt 506 and is offset to the right from any IR burners 506 on the lower belt 506. Finally, IR burners 510 are placed facing the left end of the upper belt 502, the right end of the middle belt 504, and the left end of the lower belt 506. Further, it will be appreciated that while IR burners 510 are discussed in the particular layouts described above, in alternative embodiments, IR burners may be positioned along conveyor belts and positioned relative to each other in any other suitable manner.

It will be appreciated that any of the insulators 140, 142, 144, 146, 148, 150, 160 may be constructed of stainless steel, Stainless Steel 253 MA™, high nickel steel, Rockwool™ materials, or any other suitable material. The insulators may be placed in relative close proximity to conveyor belts in such a way to maximize heat retention in the cooking zone (i.e. near the belts). It will further be appreciated that one advantage of the of using the IR burners 136 is that the effective cooking area of the IR burners 136 is essentially the footprint of the reflector-emitters 192 as compared to the effective cooking area of a gas flame being only the area of the gas flame. It will further be appreciated that while ovens 100, 400, and 500 are disclosed as having three conveyor belts (i.e. a three-pass system), the principles disclosed herein can be equally applied to any oven having one, two, three, or more such conveyor systems. Specifically, for example, an oven may comprise a single conveyor within an insulated cooking zone where the cooking zone is further substantially enveloped within an insulated oven zone.

Further, in alternative embodiments, an oven may comprise multiple conveyor belts at or near the same vertical level so that foodstuff is not dropped from one belt to another. Still further, in alternative embodiments, the cooking path may not comprise substantially level conveyor belts. Instead, an alternative embodiment may comprise a cooking path that spirals up or down, slopes up or down, or follows a meandering course. All of the above-described alternative embodiments may employ the method of reducing a required amount of energy to cook foodstuff by enclosing the cooking path using insulators located in close proximity to the cooking path (i.e. close to the conveyor belts). Further, all of the above-described alternative embodiments may employ the method of conserving heat and energy by ducting hot air and heat between various conveyors that are located at different vertical levels. Still further, all of the above-described alternative embodiments may employ the method of conserving heat and energy by further substantially enclosing a cooking zone within an oven zone using outer insulators. Finally, all of the above-described alternative embodiments may employ the use of IR burners to increase an effective cooking area as compared to using conventional slit-tube gas burner systems.

While FIGS. 1-17 and the associated discussion above disclose a highly energy efficient high temperature food oven, FIGS. 18-32 and the associated discussion below further details an important optional feature of the oven 100, namely, a belt alignment system.

Figure 18:
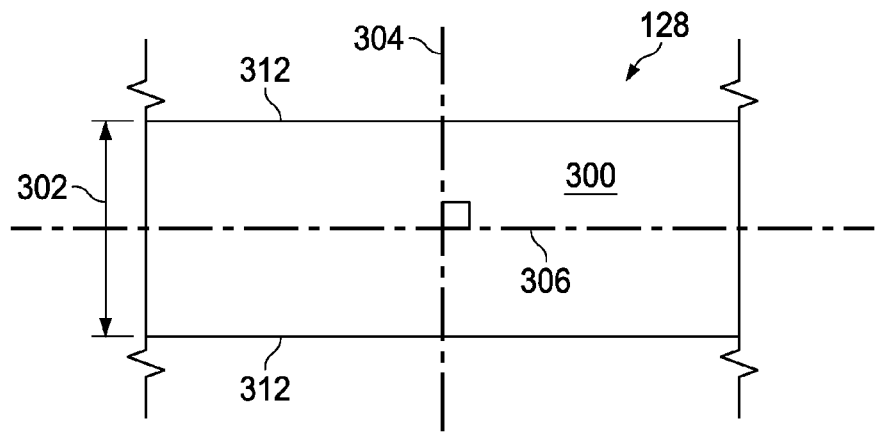
FIG. 18 is a simplified partial top view of the upper belt.

Referring now to FIG. 18, a simplified partial top view of the upper belt 128 is shown. Upper belt 128 may be described as comprising a service surface 300 upon which foodstuff may be carried atop. Most generally, the upper belt 128 may further be described as comprising a belt width 302 that may be measured along a transverse and/or lateral axis 304 that extends generally perpendicular to a longitudinal axis 306. The longitudinal axis 306 lies generally parallel to a direction of movement of the upper belt 128 when the upper belt 128 is rotating counterclockwise in a right-left (on top) and left-right (on bottom) and when the upper belt 128 is aligned.

Figure 19:
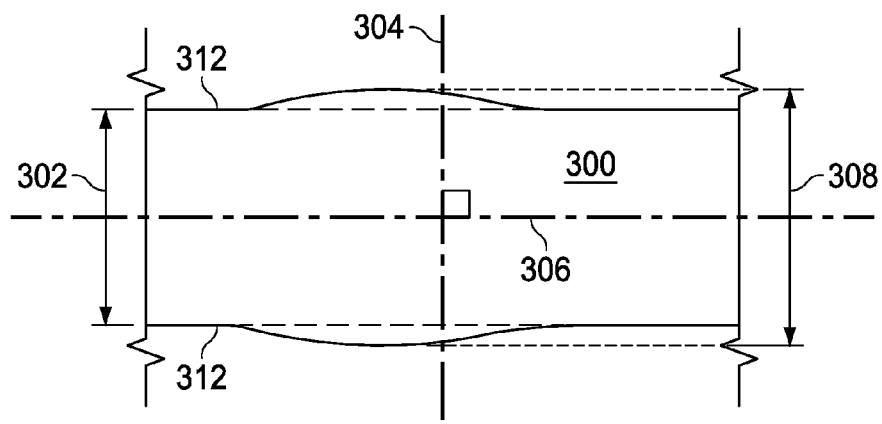
FIG. 19 is a simplified partial top view of the upper belt that has experienced bulging.

Referring now to FIG. 19, an upper belt 128 that has experienced some transverse belt bulge is shown. In some cases, a belt 128 may locally expand in a transverse direction so that the belt comprises a bulge width 308 that is greater than the above-described belt width 302. In a similar manner, a belt 128 may locally expand in a longitudinal direction so that the belt comprises irregular lengths and/or may affect a tension of the belt 128. In some cases, transverse belt bulging and/or longitudinal belt bulging and/or expansion may contribute to a belt 128 becoming misaligned and/or may allow a belt 128 to begin tracking so that a transverse bisection midline of the belt 128 that lies coincident with the longitudinal axis 306 in FIGS. 18 and 19 begins to move away from its position coincident with the longitudinal axis 306.

Figure 20:
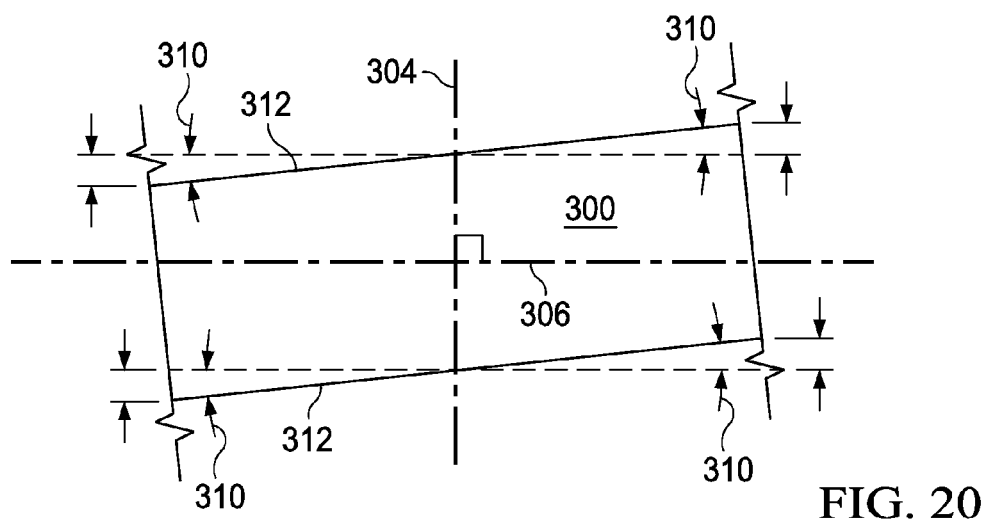
FIG. 20 is a simplified partial top view of the upper belt that is misaligned.

Referring now to FIG. 20, the upper belt 128 is shown as being misaligned. The misalignment, in this simplified representation, may be quantified as the misalignment angle 310 with which the belt edges 312 intersect the previously referenced longitudinal axis 306 (working under the simplified assumption that the belt edges 310 are substantially parallel to the previously referenced midline of the belt 128). Further, a misalignment distance 312 comprises the distance between where a belt edge 310 would be if it were aligned (to have no tracking) and centered (so that the transverse bisection midline of the belt 128 lies coincident with the longitudinal axis 306. While FIGS. 18-20 and the related discussion are primarily focused on the upper belt 128, the principles behind the belt features, geometry, and alignment are similarly applicable to other belts of the oven 100 and to other conveyor belts.

Figure 21:
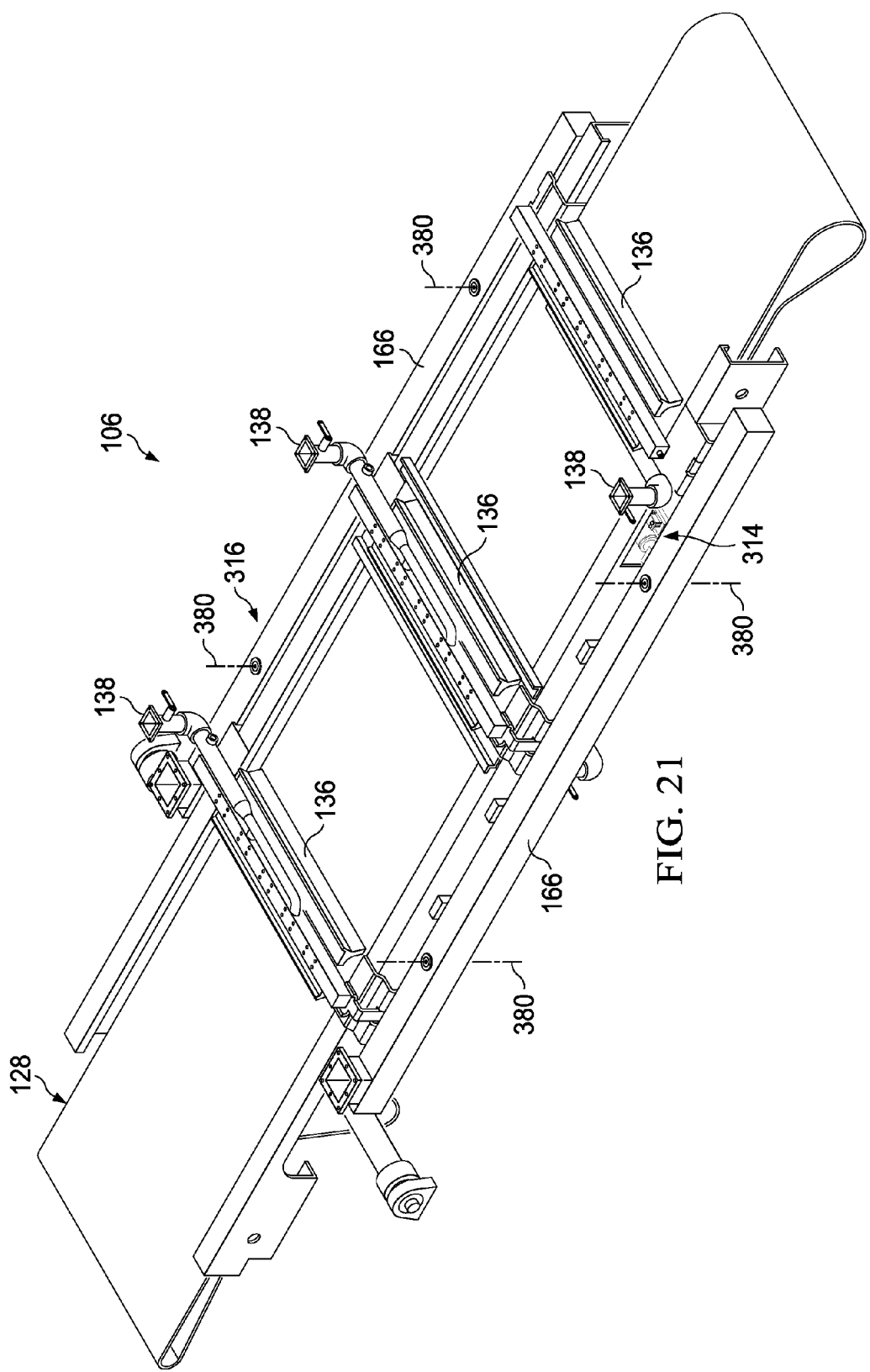
FIG. 21 is an oblique view of the upper conveyor system from a front-upper-right viewpoint.

Referring now to FIG. 21, an oblique view of the upper conveyor system 106 from a front-upper-right viewpoint is shown. The upper conveyor system 106 is shown in isolation from the remainder of the oven 100. The upper conveyor system 106, in this embodiment, comprises an upper alignment system 314 and a lower alignment system 316 (both of which are substantially obscured from view in FIG. 21) for keeping the upper belt 128 aligned along the top portion of the belt path and the bottom portion of the belt path, respectively. IR burners 136, mixers 138, and top burner upper manifolds 166 are also shown in FIG. 21 so that a relative location of the upper alignment system 314 and the lower alignment system 316 may be noted.

Referring now to FIG. 22, a partial oblique view of the upper conveyor system 106 from a front-lower-right viewpoint is shown. In FIG. 22, only the upper belt 128, rearward top burner upper manifold 166, upper alignment system 314, and lower alignment system 316 are shown. FIG. 22 shows that portions of the upper alignment system 314 are located vertically between the top portion 318 of the belt 128 (that carries foodstuff from right to left) and the bottom portion 320 of the belt 128 (that moves from left to right). FIG. 22 further shows that the majority of the lower alignment system 316 is located vertically below the bottom portion of the belt 128.

Referring now to FIG. 23, an orthogonal front view of the upper belt 128 in isolation is shown. The rotation direction of the belt 128 is indicated by small arrows along the belt path. FIG. 23 is helpful in demonstrating which portion of the belt 128 comprises the top portion 318 of the belt 128 and which portion of the belt 128 comprises the bottom portion of the belt 128. As shown, the top portion 318 of the belt 128 comprises the portion of the belt 128 that is displaced leftward while the belt 128 is rotated counterclockwise. The bottom portion 320 of the belt 128 comprises the portion of the belt 128 that is displaced rightward while the belt 128 is rotated counterclockwise. FIG. 23 is also helpful in showing that the top portion 318 has an upper side 322 and a lower side 324.

The bottom portion 320 also has an upper side 326 and a lower side 328. The upper alignment system 314 extends through a space between the lower side 324 of the top portion 318 of the belt 128 and the upper side 326 of the bottom portion 320 of the belt 128. In contrast, the lower alignment system 316 is disposed primarily vertically lower than the lower side 328 of the bottom portion 320 of the belt 128.

Figure 24:
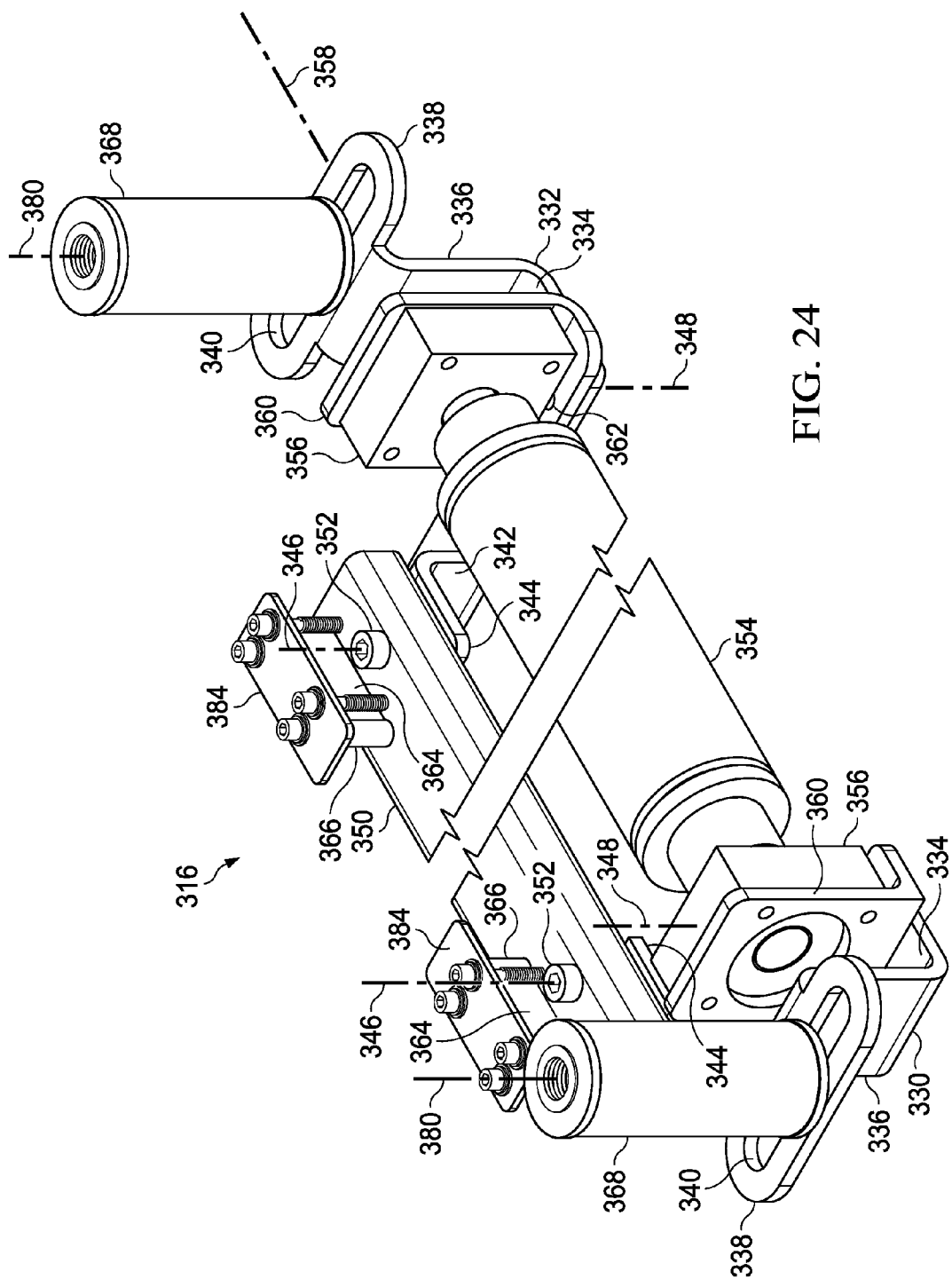
FIG. 24 is an oblique view of the lower alignment system from a front-upper-right viewpoint.
Figure 25:
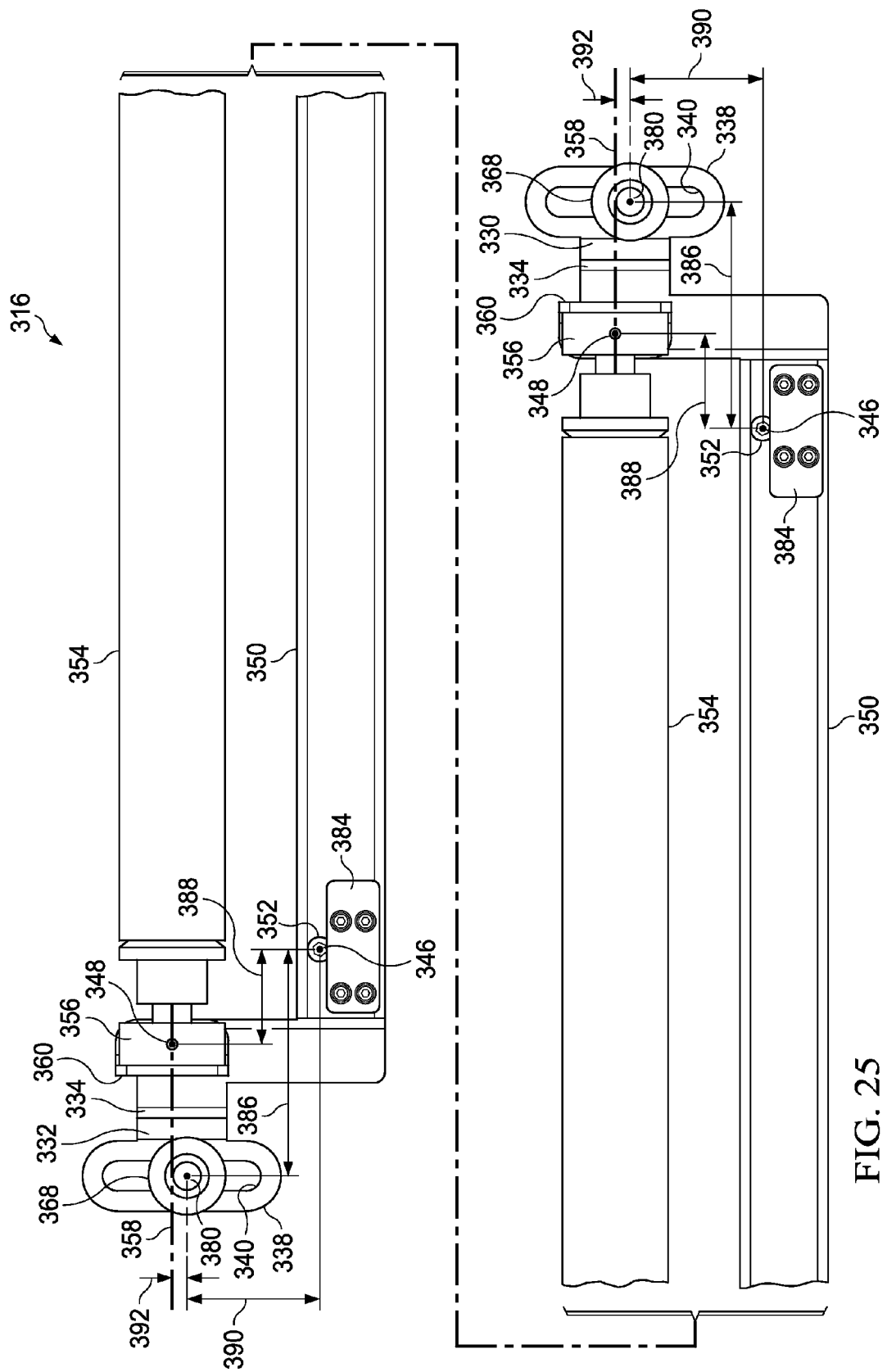
FIG. 25 is an orthogonal top view of the lower alignment system.
Figure 26:
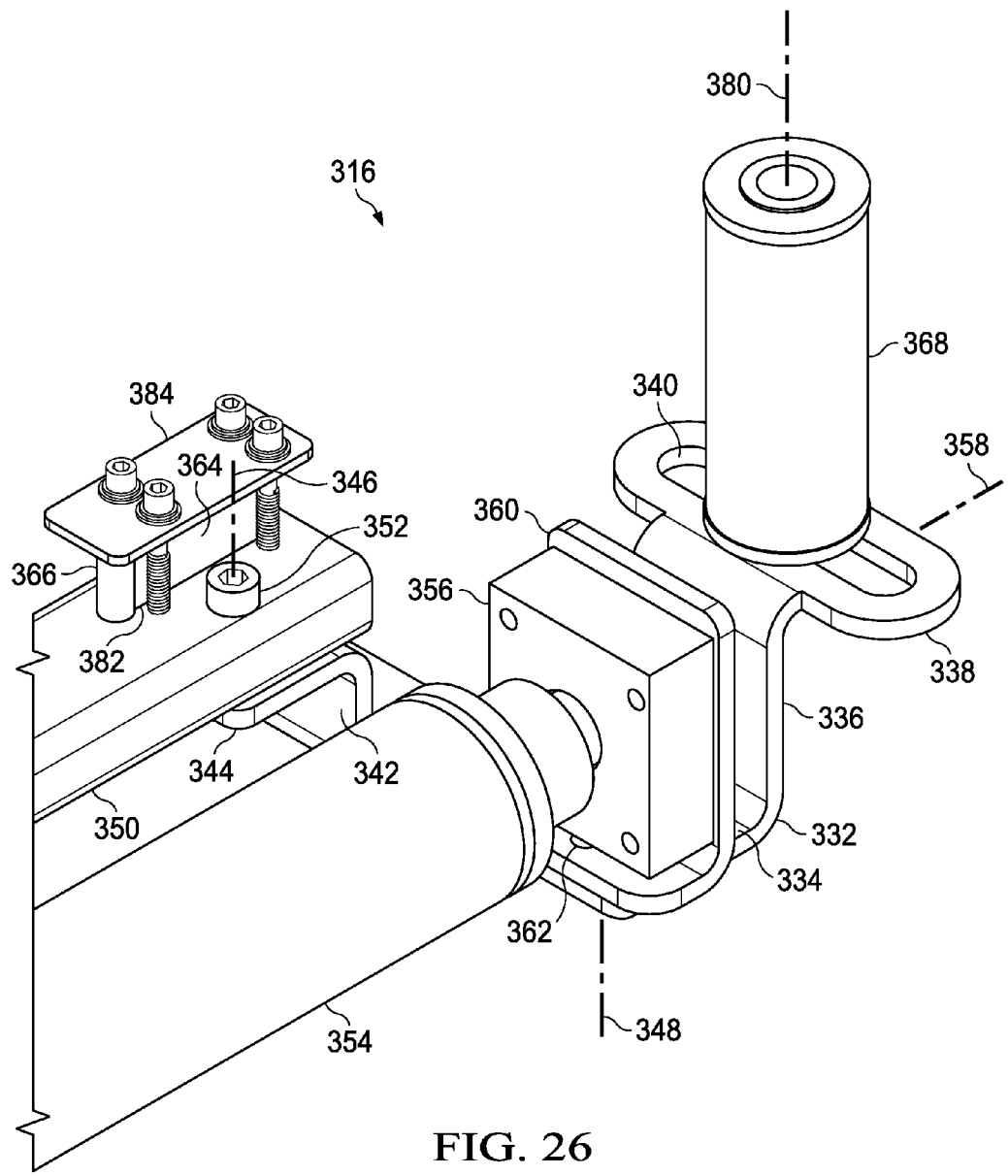
FIG. 26 is an oblique view of a rear portion of the lower alignment system from an upper-front-right viewpoint.
Figure 27:
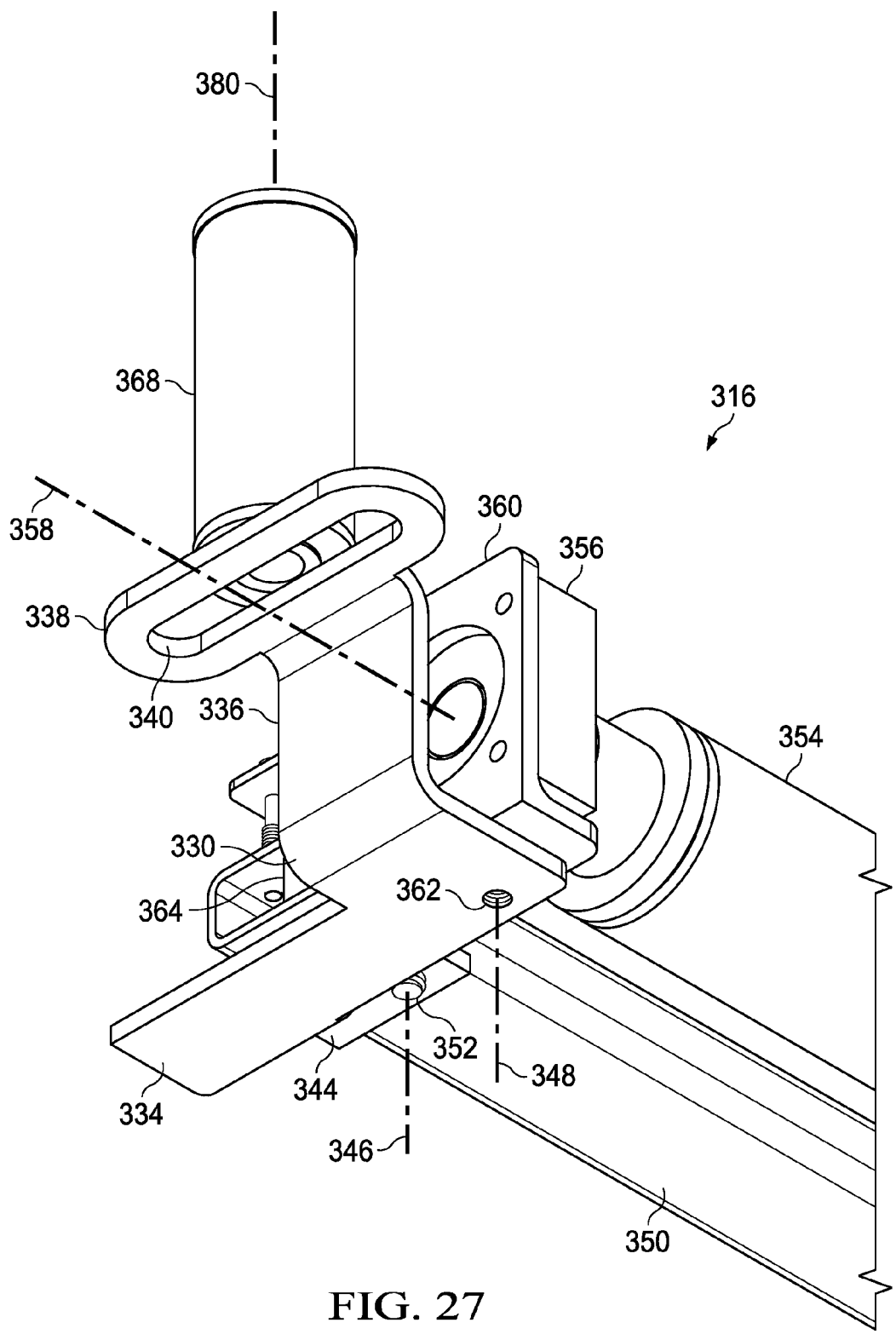
FIG. 27 is an oblique view of a front portion of the lower alignment system from a front-lower-right viewpoint.

Referring now to FIGS. 24-27, the lower alignment system 316 in isolation is shown. FIG. 24 provides an oblique view of the lower alignment system 316 from a front-upper-right viewpoint. FIG. 25 provides an orthogonal top view of the lower alignment system 316. FIG. 26 provides an oblique view of a rear portion of the lower alignment system 316 from an upper-front-right viewpoint. FIG. 27 provides an oblique view of a front portion of the lower alignment system 316 from a front-lower-right viewpoint. Most generally, the lower alignment system 316 may be conceptualized as a four bar linkage in which four substantially rigid bodies are rotatably pinned together and in which two opposing rigid bodies are each additionally rotatably pinned about vertical axes of rotation.

A first and second of the four above-mentioned substantially rigid elements are the front step arm 330 and the rear step arm 332. Because the front step arm 330 and the rear step arm 336 are configured substantially as mirror images of each other about a lateral bisection plane that lies coincident with the longitudinal axis 306 and perpendicular to the transverse axis 304, where description of the step arms 330, 332 may not be described in an equally applicable manner, description of only one of the step arms 330, 332 may be provided. Even where description of only one step arm feature is provided, the corresponding mirror image feature of the other step arm may be identically labeled with an understanding that directionality of the one described step arm may be reverse for the other step arm.

Each step arm 330, 332 may be constructed of a unitary metal piece. The step arm may comprise a base plate 334 that lies substantially parallel to the upper side 322 of belt 128. The base plate 334 may comprise an outer riser 336 comprising a plate-like structure that extends vertically from a laterally outermost side of the base plate 334. A mounting plate 338 may extend laterally outward from an upper end of the outer riser 336. The mounting plate 338 may comprise a longitudinal mounting slot 340 for selectively receiving mounting fasteners therethrough. An inner riser 342 (see FIG. 24) comprising a plate-like structure may extend vertically from a laterally innermost side of the base plate 334 and may be located further leftward than the outer riser 336. A connection plate 344 may extend laterally inward from an upper end of the inner riser 342. The connection plate 344 may comprise a plate-like structure comprising a hole having a connection axis 346. The base plate 334 may similarly comprise a hole having a base plate axis 348.

A third of the above-mentioned four substantially rigid elements is an input crossbar 350. The input crossbar 350, in some embodiments, may comprise a rectangular tubing that generally extends laterally underneath the lower side 328 of the belt 128 and is rotatably pinned about the connection axes 346 to the upper sides of the connection plates 344 by any suitable fastener 352. In some embodiments, the fastener 352 may comprise a smooth bolt secured by a complementary nut.

A fourth of the above-mentioned four substantially rigid elements is a steering roller 354. The steering roller 354 may comprise any suitable roller configured for use with the upper belt 128 and the steering roller 354 may be rotatably mounted between two bearing assemblies 356 so that the steering roller 354 may rotate about a steering roller axis 358. The bearing assemblies 356 may be mounted to substantially L-shaped bearing brackets 360. The bearing brackets 360 may comprise bearing bracket holes 362 suitable for receiving fasteners therethrough. The bearing bracket holes 362 may be coaxial with the base plate axis 348 so that a fastener may extend through the bearing bracket 360 and the base plate 334, thereby rotatably pinning the bearing bracket 360 to the base plate 334.

Input slides 364 may be carried by the input crossbar 350 near the lateral ends of the input crossbar 350. In the present embodiment, the input slides 364 may be constructed of ceramic or any other suitable low friction wear resistant material. In other embodiments, the input slides 364 may be constructed of any other material, such as but not limited to, metal. In the present embodiment, the input slides 364 comprise a rectangular ceramic plate having a rounded and/or bulbous innermost lateral side 366. The input slides 364 may be partially received into an interior of the input crossbar 350 through a slide hole 382 and a retainer plate 384 may capture the input slide 364 between the retainer plate 384 and a bottom side of the input crossbar 350 through the use of fasteners such as threaded bolts.

Figure 28:
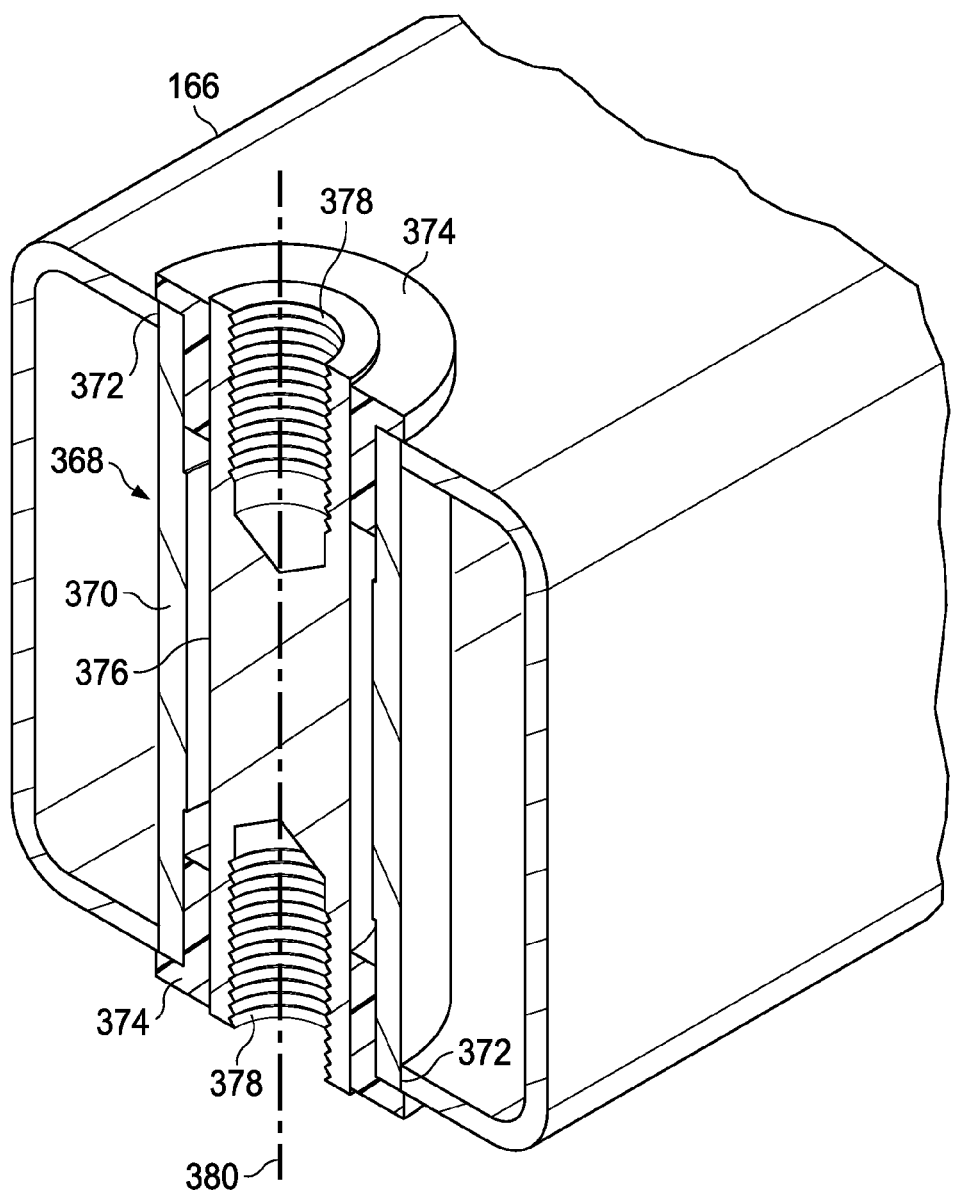
FIG. 28 is a cross-sectional view of a swivel assembly installed in a top burner upper manifold.

Referring now to FIG. 28, a cross-sectional view of a swivel assembly 368 installed in a top burner upper manifold 166 is shown. The swivel assembly 368 comprises an outer tube 370 configured for insertion in two coaxial and vertically offset holes 372 of the top burner upper manifold 166. Each end of the outer tube 370 is configured to receive a low friction bushing 374 so that a cylindrical swivel core 376 may be carried by the bushings 374. The swivel core 376 is shown as comprising receiver holes 378 for receiving fasteners that, on the upper end of the swivel assembly 368, prevent the swivel assembly 368 from passing further downward through the holes 372, and on the lower end of the swivel assembly 368, attach the mounting plates 338 to the swivel core 376. Such connection of the mounting plate 338 to the swivel core 376 allows the attached step arms 330, 332 to rotate about vertical swivel axes 380.

Referring now to FIG. 25, offset distances of the axes about which the input crossbar 350 and the steering roller 354 are pinned relative to the step arms 330, 332 are shown. Specifically, it can now be seen that the lateral input offset 386 is greater than and the same in sign as the lateral roller offset 388. Similarly, the longitudinal input offset 390 is greater in magnitude but opposite in sign as the longitudinal roller offset 392. Because of the above-described geometry, movements of the input crossbar 350 that skew the input crossbar 350 from parallel to the transverse axis 304 by a resultant angle of incidence will result in less of a change in resultant angle of incidence between the steering roller 354 and the transverse axis.

Figure 29:
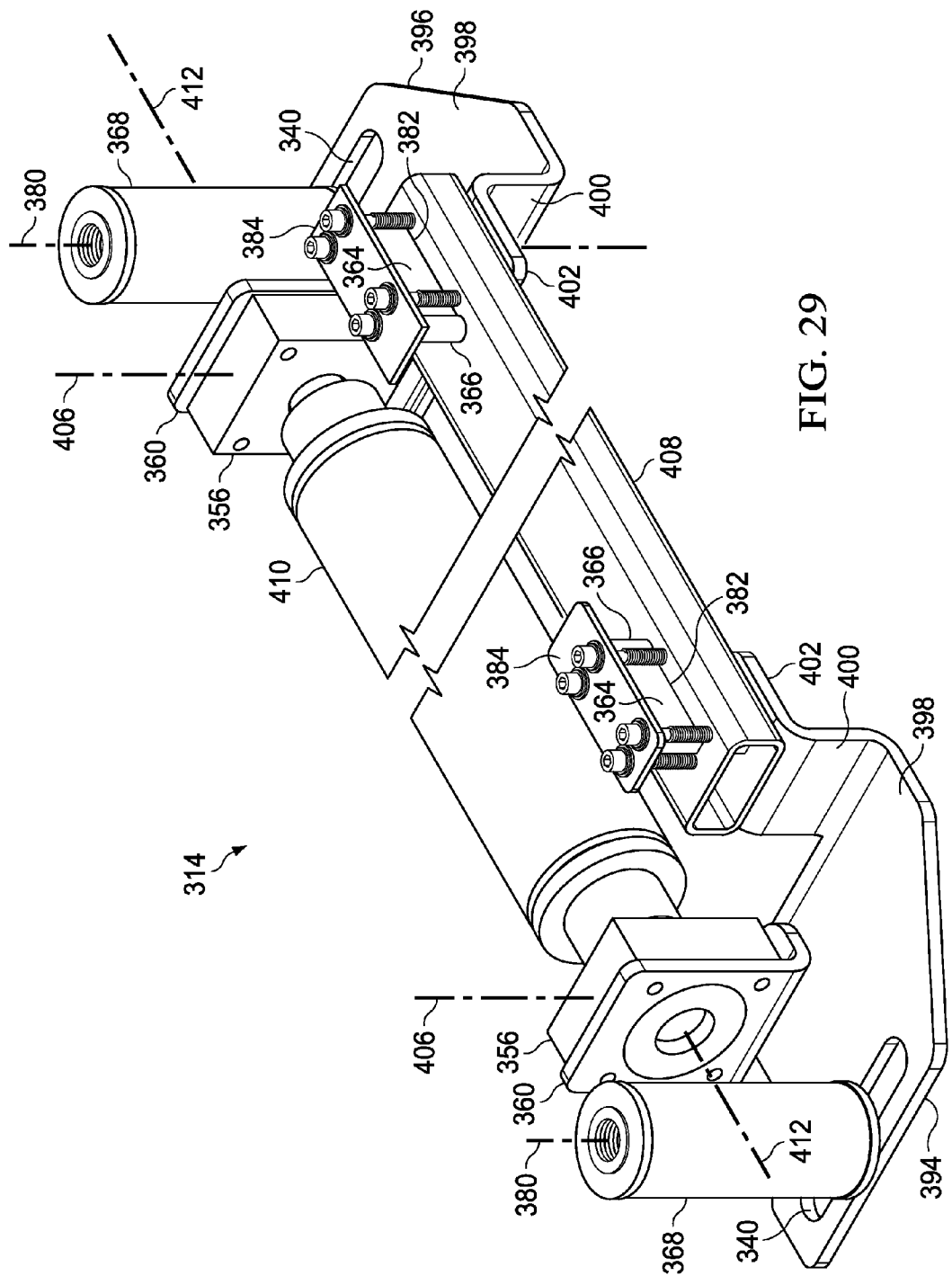
FIG. 29 an oblique view of the upper alignment system from a front-upper-right viewpoint.
Figure 30:
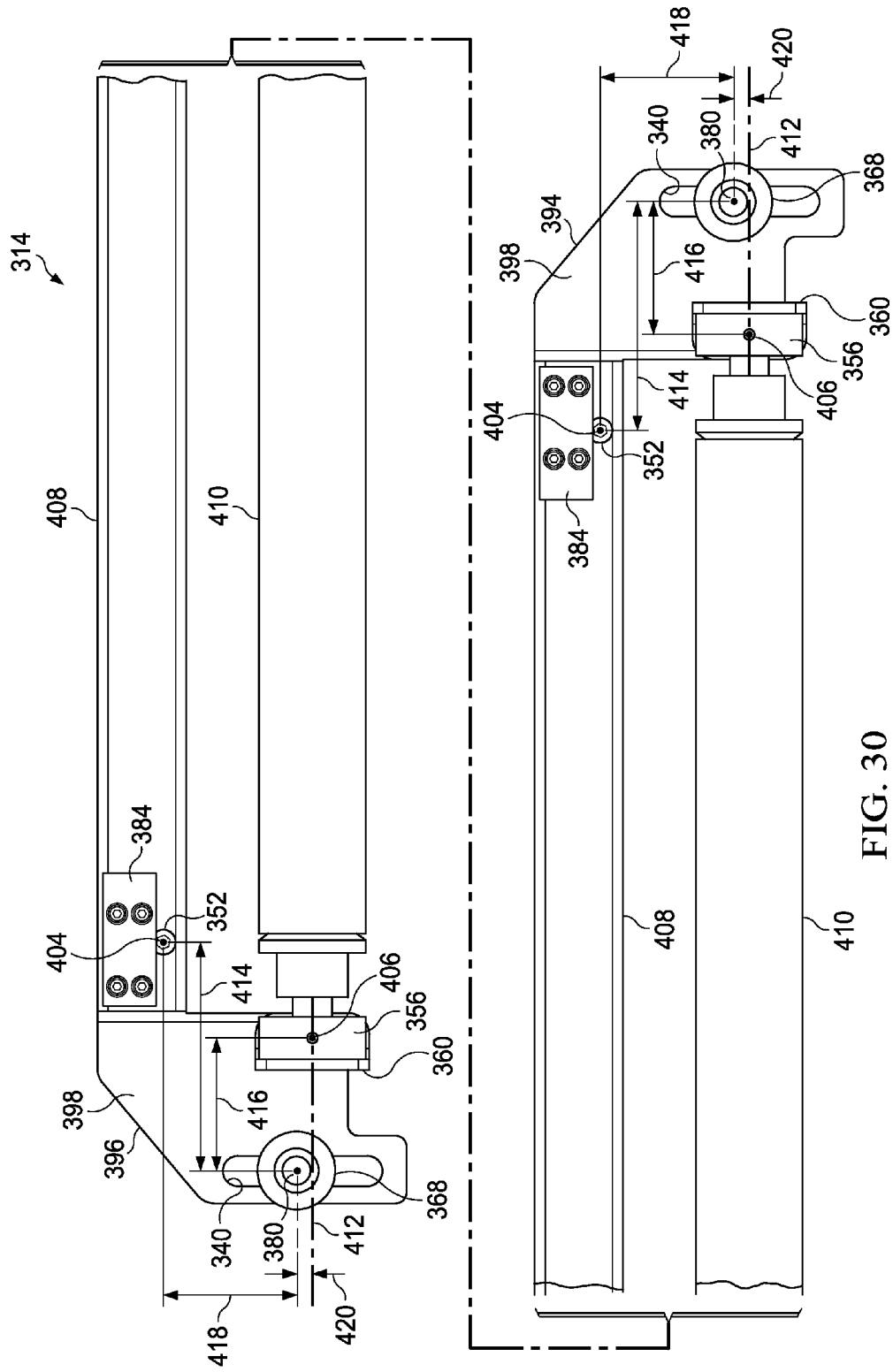
FIG. 30 is an orthogonal top view of the upper alignment system.
Figure 31:
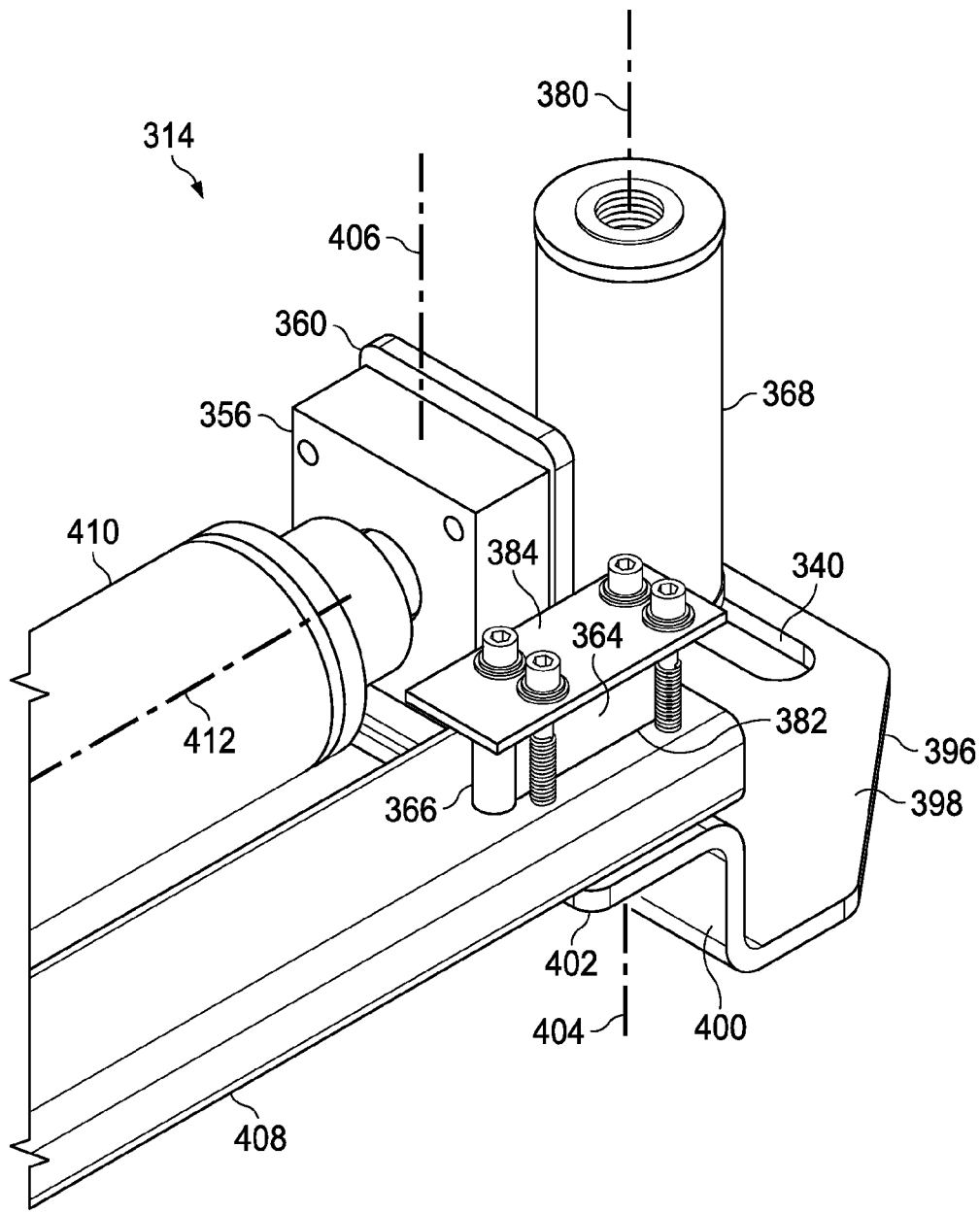
FIG. 31 is an oblique view of a rear portion of the upper alignment system from an upper-front-right viewpoint.
Figure 32:
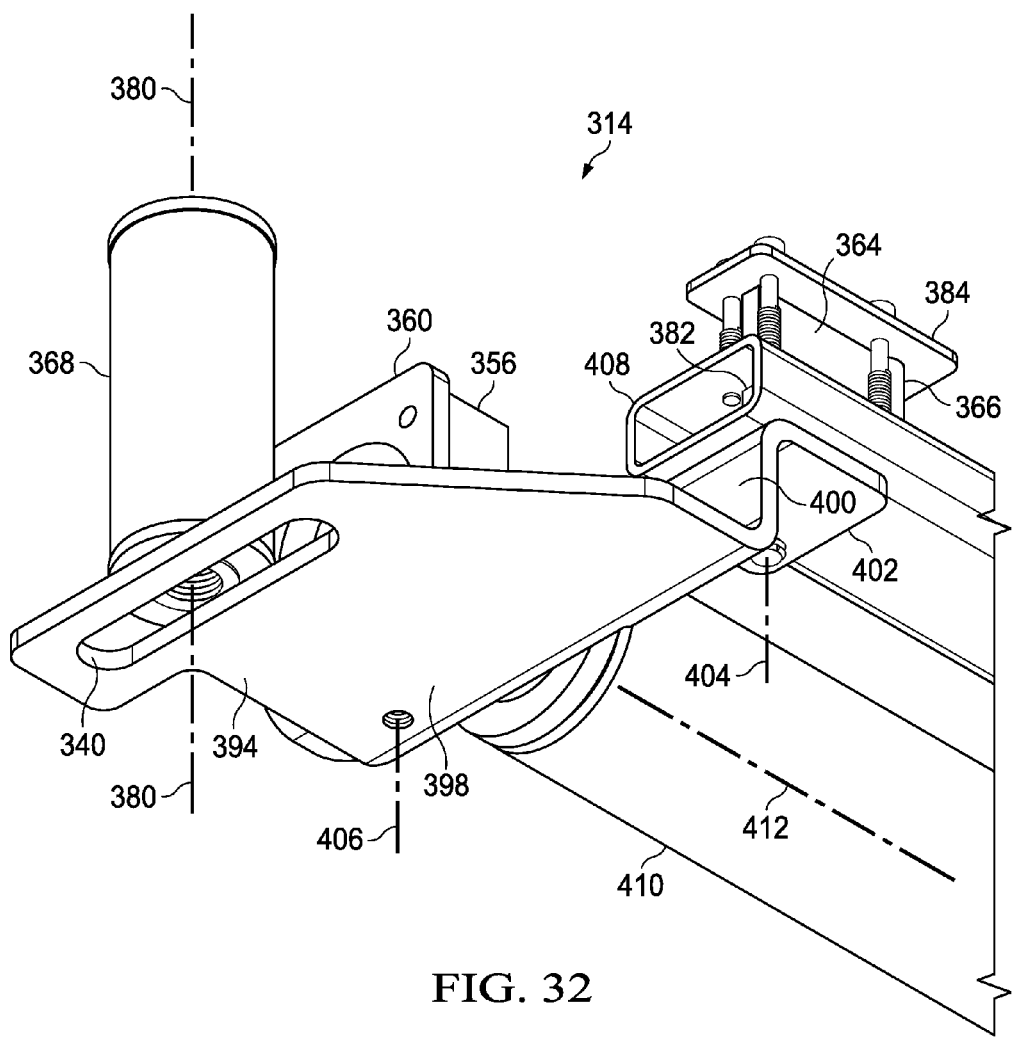
FIG. 32 is an oblique view of a front portion of the upper alignment system from a front-lower-right viewpoint.

Referring now to FIGS. 29-32, the upper alignment system 314 in isolation is shown. FIG. 29 provides an oblique view of the upper alignment system 314 from a front-upper-right viewpoint. FIG. 30 provides an orthogonal top view of the upper alignment system 314. FIG. 31 provides an oblique view of a rear portion of the upper alignment system 314 from an upper-front-right viewpoint. FIG. 32 provides an oblique view of a front portion of the upper alignment system 314 from a front-lower-right viewpoint. Most generally, the upper alignment system 314 may be conceptualized as a four bar linkage in which four substantially rigid bodies are rotatably pinned together and in which two opposing rigid bodies are each additionally rotatably pinned about vertical axes of rotation.

A first and second of the four above-mentioned substantially rigid elements are the front step arm 394 and the rear step arm 396. Because the front step arm 394 and the rear step arm 396 are configured substantially as mirror images of each other about a lateral bisection plane that lies coincident with the longitudinal axis 306 and perpendicular to the transverse axis 304, where description of the step arms 394, 396 may not be described in an equally applicable manner, description of only one of the step arms 394, 396 may be provided. Even where description of only one step arm feature is provided, the corresponding mirror image feature of the other step arm may be identically labeled with an understanding that directionality of the one described step arm may be reverse for the other step arm.

Each step arm 394, 396 may be constructed of a unitary metal piece. The front step arm 394 may comprise a base plate 398 that lies substantially parallel to the upper side 322 of belt 128. The base plate 398 may comprise a longitudinal mounting slot 340 for selectively receiving mounting fasteners therethrough. An inner riser 400 comprising a plate-like structure may extend vertically from a laterally innermost side of the base plate 398. A connection plate 402 may extend laterally inward from an upper end of the inner riser 400. The connection plate 402 may comprise a plate-like structure comprising a hole having a connection axis 404. The base plate 398 may similarly comprise a hole having a base plate axis 406 located further leftward than the connection axis 404.

A third of the above-mentioned four substantially rigid elements is an input crossbar 408. The input crossbar 408, in some embodiments, may comprise a rectangular tubing that generally extends laterally between the top portion 318 and the bottom portion 320 of the belt 128 and is rotatably pinned about the connection axes 404 to the upper sides of the connection plates 402 by any suitable fastener 352. In some embodiments, the fastener 352 may comprise a smooth bolt secured by a complementary nut.

A fourth of the above-mentioned four substantially rigid elements is a steering roller 410. The steering roller 410 may comprise any suitable roller configured for use with the upper belt 128 and the steering roller 410 may be rotatably mounted between two bearing assemblies 356 so that the steering roller 410 may rotate about a steering roller axis 412. The bearing assemblies 356 may be mounted to substantially L-shaped bearing brackets 360. The bearing brackets 360 may comprise bearing bracket holes 362 suitable for receiving fasteners therethrough. The bearing bracket holes 362 may be coaxial with the base plate axis 406 so that a fastener may extend through the bearing bracket 360 and the base plate 398, thereby rotatably pinning the bearing bracket 360 to the base plate 398.

Input slides 364 may be carried by the input crossbar 408 near the lateral ends of the input crossbar 408. The input slides 364 may be constructed of ceramic or any other suitable low friction wear resistant material. In this embodiment, the input slides 364 comprise a rectangular ceramic plate having a rounded and/or bulbous innermost lateral side 366. The input slides 364 may be partially received into an interior of the input crossbar 408 through a slide hole 382 and a retainer plate 384 may capture the input slide 364 between the retainer plate 384 and a bottom side of the input crossbar 408 through the use of fasteners such as threaded bolts.

The upper alignment system 314 may be attached to and carried by a top burner upper manifold 166 through the use of swivel assemblies 368 so that the step arms 394, 396 are free to rotate about vertical swivel axes 380.

Referring now to FIG. 30, offset distances of the axes about which the input crossbar 408 and the steering roller 410 are pinned relative to the step arms 394, 396 are shown. Specifically, it can now be seen that the lateral input offset 414 is greater than and the same in sign as the lateral roller offset 416. Similarly, the longitudinal input offset 418 is greater in magnitude but opposite in sign as the longitudinal roller offset 420. Because of the above-described geometry, movements of the input crossbar 408 that skew the input crossbar 408 from parallel to the transverse axis 304 by a resultant angle of incidence will result in less of a change in angle of incidence between the steering roller 410 and the transverse axis.

Figure 33:
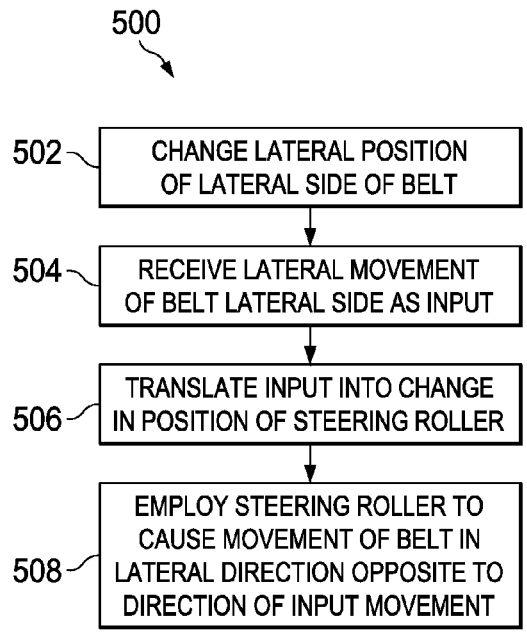
FIG. 33 is a flowchart of a method of aligning a belt.

Referring now to FIG. 33, a flowchart of a method 500 of aligning a belt is shown. At block 502, a belt may bulge, track, or otherwise undergo a change in lateral position of a lateral side of the belt.

At block 504, the change in position of the lateral side of the belt may be received by a belt alignment system as an input. In some embodiments, the input may be received as a result of the lateral side contacting and/or causing movement of a component of the belt alignment system.

At block 506, the lateral displacement of the lateral side of the belt may be translated by the belt alignment system into a change in position of a steering roller of the belt alignment system. In some embodiments, the change in position of the steering roller may comprise changing an angle of incidence between the steering roller and a transverse axis of the belt. In some embodiments, an amount of change in the angle of incidence may be substantially linearly related to the amount of movement of the lateral side of the belt. In other embodiments, cams and/or other mechanical components may be employed to provide a nonlinear relationship between an amount of change in the angle of incidence and the amount of change in position of the lateral side of the belt. Further, in other embodiments, a vertical position of the steering roller may be altered instead of or in addition to the change in the angle of incidence.

At block 508, resultant forces may be applied to the belt from the steering roller as a result of the changes made to the steering roller at block 506 so that the belt is caused to move laterally in a direction opposite to the direction of movement employed by the belt alignment system as an input at block 504.

Figure 34:
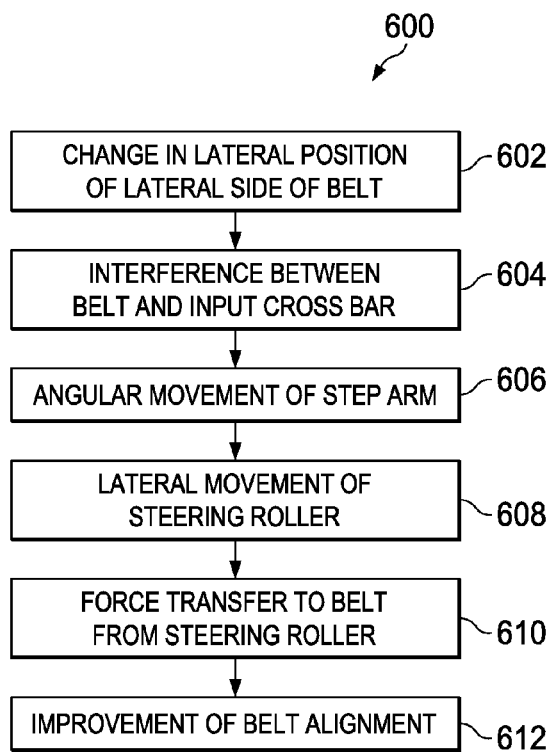
FIG. 34 is a flowchart of another method of aligning a belt.

Referring now to FIG. 34, a flowchart of a method 600 of aligning a belt is shown. At block 602, a belt may bulge, track, or otherwise undergo a change in lateral position of a lateral side of the belt.

At block 604, the change may cause mechanical interference with a component of an input crossbar of a belt alignment system.

At block 606, substantially transverse movement of the belt may cause angular movement of a step arm movably joined to each of the input crossbar and a steering roller wherein both the input crossbar and the steering roller extend transversely relative to a longitudinal direction of rotation of the belt.

At block 608, the angular movement of the step arm may cause lateral movement of the steering roller in a direction opposite to the movement of the input crossbar.

At block 610, the steering roller may transfer forces to the belt having a lateral directional component in a direction opposite to the movement of the input crossbar.

At block 612, the belt may move in a direction opposite to the movement of the input crossbar.

Both of the methods 500 and 600 disclose aligning a belt using mechanical components configured to receive a mechanical input commensurate with a degree of belt misalignment and providing output forces to cause the belt to move so that belt alignment is improved.

The upper alignment system 314 and the lower alignment systems 316 may be located at any other selected locations along upper belt 128 and/or other belts 130, 132 of the oven 100. Each conveyor system 106, 108, 110 of the oven 100 may comprise any number of combinations of upper alignment systems 314 and lower alignment systems 316. For example, the lower conveyor system 110 may comprise two upper alignment systems 314 and two lower alignment systems 316 while the middle conveyor system 108 comprises only three upper alignment systems 314.

It will be appreciated that the step arms 330 and 332 and the step arms 394 and 396, as a result of calibrating or otherwise initially installing the upper alignment systems 314 and lower alignment systems 316, may not be located directly transverse from each other. In other words, in some embodiments, the swivel assemblies 368 may be selectively located at various locations along mounting slots 340.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The discussion of a reference in the disclosure is not an admission that it is prior art, especially any reference that has a publication date after the priority date of this application.

What is claimed is:

1. A belt alignment system, comprising:
a first step arm spatially configured to selectively rotate about a substantially vertical first axis;
a second step arm generally laterally offset from the first step arm and spatially configured to selectively rotate about a substantially vertical second axis;
an input linkage extending an input linkage length between pivotal connections to each of the first step arm and the second step arm, the input linkage extending generally laterally relative to a longitudinal primary direction of travel of a belt;
a first element connected to the input linkage, the first element being movable in response to mechanical interference between the first element and a lateral side of the belt; and
a steering roller extending a steering roller length between pivotal connections to each of the first step arm and the second step arm, the steering roller extending generally laterally relative to the longitudinal primary direction of travel of the belt and configured to change position in response to the mechanical interference;
wherein when the input linkage is substantially parallel to the steering roller, the pivotal connections of the input linkage are longitudinally offset from each of the first axis and the second axis in a first offset direction, the pivotal connections of the steering roller are longitudinally offset from each of the first axis and the second axis in a second offset direction generally opposite the first offset direction, and wherein the input linkage length is less than the steering roller length.

2. The belt alignment system according to claim 1, wherein the change in position comprises a change in an angle of incidence between the steering roller and an axis transverse to the longitudinal primary direction of travel of the belt.

3. The belt alignment system according to claim 1, wherein the change in position comprises an amount linearly related to an amount of movement of the first element.

4. The belt alignment system according to claim 1, wherein the first element comprises a ceramic slider configured for sliding contact against the belt.

5. The belt alignment system according to claim 1, wherein a change in an angle of incidence between the steering roller and an axis transverse to the longitudinal primary direction of travel of the belt is less than a change in an angle of incidence between the first element and the axis transverse to the rotational direction of the belt.

6. A method of aligning a belt, comprising:
providing an input linkage and a steering roller, each extending generally transverse relative to a primary longitudinal direction of travel of a belt;
pivotally connecting each of the input linkage and the steering roller between a first step arm and a second step arm, thereby defining an input linkage distance and a steering roller distance, respectively, the input linkage distance being less than the steering roller distance, spatially restraining the first step arm to selectively rotate about a first vertical axis, and spatially restraining the second step arm to selectively rotate about a second vertical axis, wherein when the input linkage is substantially parallel to the steering roller, the pivotal connections of the input linkage are longitudinally offset from each of the first vertical axis and the second vertical axis in a first offset direction and the pivotal connections of the steering roller are longitudinally offset from each of the first vertical axis and the second vertical axis in a second offset direction generally opposite the first offset direction;
changing a lateral position of a lateral side of the belt;
receiving lateral movement of the belt as an input;
translating the lateral movement of the belt into a change in position of the steering roller; and
employing the steering roller to move the belt in a lateral direction opposite to the direction of lateral movement received as the input.

7. The method of claim 6, further comprising:
sliding the belt against a ceramic slider while receiving the lateral movement as an input via the ceramic slider.

8. The method of claim 6, wherein the change in position of the steering roller comprises changing an angle of incidence between the steering roller and a transverse axis of the belt.

9. The method of claim 6, wherein the change in position of the steering roller comprises laterally displacing the steering roller by an amount less than an amount of the change in lateral position of the belt.

10. The method of claim 6, wherein the change in lateral position of the belt causes unequal but same sign changes in angles of incidence (1) between an axis of the input linkage and a transverse axis of the belt and (2) between an axis of the steering roller and the transverse axis of the belt.

11. An oven, comprising:
a belt configured for rotation in a longitudinal direction; and
an alignment system, an angular movement of a steering roller relative to the transverse direction, the alignment system comprising:
a first step arm spatially configured to selectively rotate about a substantially vertical first axis;
a second step arm generally laterally offset from the first step arm and spatially configured to selectively rotate about a substantially vertical second axis;
an input linkage extending an input linkage length between pivotal connections to each of the first step arm and the second step arm, the input linkage extending generally laterally relative to a longitudinal primary direction of travel of the belt;
a first element connected to the input linkage, the first element being movable in response to mechanical interference between the first element and a lateral side of the belt; and
a steering roller extending a steering roller length between pivotal connections to each of the first step arm and the second step arm, the steering roller extending generally laterally relative to the longitudinal primary direction of travel of the belt configured to change position in response to the mechanical interference;
wherein when the input linkage is substantially parallel to the steering roller, the pivotal connections of the input linkage are longitudinally offset from each of the first axis and the second axis in a first offset direction, the pivotal connections of the steering roller are longitudinally offset from each of the first axis and the second axis in a second offset direction generally opposite the first offset direction, and wherein the input linkage length is less than the steering roller length.

12. The oven of claim 11, wherein the steering roller is configured to contact the belt during a change in position of the steering roller.

13. The oven of claim 11, wherein the alignment system is carried by at least one air delivery path of the oven.

14. The oven of claim 13, wherein the alignment system comprises a ceramic slider for receiving forces from the belt.

15. The oven of claim 14, wherein at least a portion of the alignment system extends between a top portion of the belt and a bottom portion of the belt.

* * * * *